(12) United States Patent
Fernaine et al.

(10) Patent No.: US 10,956,838 B2
(45) Date of Patent: Mar. 23, 2021

(54) RETAIL STORE INFORMATION TECHNOLOGY INCIDENT TRACKING MOBILE APPLICATION

(71) Applicant: TARGET BRANDS, INC., Minneapolis, MN (US)

(72) Inventors: Thierry Fernaine, Minneapolis, MN (US); Troy Thomas Collings, Delano, MN (US)

(73) Assignee: Target Brands, Inc., Minneapolis, MN (US)

(*) Notice: Subject to any disclaimer, the term of this patent is extended or adjusted under 35 U.S.C. 154(b) by 306 days.

(21) Appl. No.: 16/112,123

(22) Filed: Aug. 24, 2018

(65) Prior Publication Data

US 2019/0066006 A1 Feb. 28, 2019

Related U.S. Application Data

(60) Provisional application No. 62/549,684, filed on Aug. 24, 2017.

(51) Int. Cl.
| | | |
|---|---|---|
| *G06Q 10/06* | (2012.01) | |
| *G06F 9/54* | (2006.01) | |
| *G06F 3/0481* | (2013.01) | |
| *H04L 12/24* | (2006.01) | |
| *G06F 3/16* | (2006.01) | |

(52) U.S. Cl.
CPC ......... *G06Q 10/06* (2013.01); *G06F 3/04817* (2013.01); *G06F 3/167* (2013.01); *G06F 9/542* (2013.01); *H04L 41/06* (2013.01); *H04L 41/5061* (2013.01); *G06F 2209/544* (2013.01)

(58) Field of Classification Search
CPC ............... H04L 41/5074; H04L 43/045; H04L 41/0631; H04L 41/22; G06F 2201/875; G06F 11/327; G06Q 10/00; G06Q 10/06
See application file for complete search history.

(56) References Cited

U.S. PATENT DOCUMENTS

| | | | | |
|---|---|---|---|---|
| 6,032,184 A | * | 2/2000 | Cogger ............... | G06F 11/0709 709/223 |
| 6,370,575 B1 | * | 4/2002 | Dougherty ............. | G06Q 10/10 707/999.104 |
| 7,117,239 B1 | * | 10/2006 | Hansen ............... | G06F 11/0748 709/200 |
| 7,266,764 B1 | * | 9/2007 | Flam ..................... | G06F 3/0482 715/209 |

(Continued)

OTHER PUBLICATIONS

Remedy Help Desk 5.5—User's Guide Remedy, Jun. 2003 (Year: 2003).*
TrackWise—User's Guide Sparta Systems, Inc., 2000 (Year: 2000).*

*Primary Examiner* — Scott L Jarrett
(74) *Attorney, Agent, or Firm* — Hamre, Schumann, Mueller & Larson, P.C.

(57) ABSTRACT

A computer-implemented method for tracking information technology (IT) incidents across a network of retail stores via a graphical user interface (GUI) on a display of a user device is disclosed. The method includes, via an IT manager that is accessible from the user device, receiving, from the user device, a store identifier; determining one or more IT incidents based on the store identifier; and via an application running on the user device, displaying on the display of the user device, a status of the one or more IT incidents based on the store identifier.

20 Claims, 15 Drawing Sheets

(56) References Cited

U.S. PATENT DOCUMENTS

| | | | | |
|---|---|---|---|---|
| 7,383,474 | B2* | 6/2008 | Sekizawa | G06F 11/3006 399/8 |
| 7,400,241 | B2* | 7/2008 | Horitgami | G06F 11/0748 340/506 |
| 7,647,391 | B1* | 1/2010 | Jean | G06Q 10/087 709/223 |
| 8,655,336 | B1* | 2/2014 | Dempski | H04W 24/04 455/418 |
| 8,903,933 | B1* | 12/2014 | Bellini, III | H04L 51/046 709/206 |
| 9,495,062 | B1* | 11/2016 | Reiner | G06F 3/0481 |
| 9,866,464 | B1* | 1/2018 | Miltenberger | H04L 51/24 |
| 2003/0117439 | A1* | 6/2003 | Zver | G06Q 10/10 715/765 |
| 2007/0078863 | A1* | 4/2007 | Thompson | G06Q 10/06 |
| 2008/0091983 | A1* | 4/2008 | Boss | G06Q 30/02 714/48 |
| 2008/0181100 | A1* | 7/2008 | Yang | H04L 41/0654 370/216 |
| 2008/0263077 | A1* | 10/2008 | Boston | G06Q 10/06 |
| 2009/0106327 | A1* | 4/2009 | Dilman | G06F 11/0793 |
| 2009/0204588 | A1* | 8/2009 | Hosono | G06F 16/319 |
| 2012/0123880 | A1* | 5/2012 | Craft | G06Q 20/20 705/16 |
| 2013/0085625 | A1* | 4/2013 | Wolfe | G06F 19/00 701/1 |
| 2013/0176858 | A1* | 7/2013 | Zee | H04L 41/0631 370/241 |
| 2015/0180728 | A1* | 6/2015 | Forrest | G07F 19/209 709/207 |
| 2015/0310645 | A1* | 10/2015 | Baumecker | G06T 11/206 345/440 |
| 2016/0274770 | A1* | 9/2016 | Lovati | G06Q 10/06 |
| 2018/0218057 | A1* | 8/2018 | Beckham | G06Q 50/02 |
| 2019/0228847 | A1* | 7/2019 | Soli | G16H 40/20 |
| 2019/0265865 | A1* | 8/2019 | Yaseen | G06F 3/04842 |
| 2019/0266064 | A1* | 8/2019 | Srinivasan | H04L 41/22 |
| 2019/0347282 | A1* | 11/2019 | Cai | G06K 9/6231 |
| 2020/0074001 | A1* | 3/2020 | Lloyd | G06Q 30/016 |

* cited by examiner

US 10,956,838 B2

RETAIL STORE INFORMATION TECHNOLOGY INCIDENT TRACKING MOBILE APPLICATION

FIELD

This disclosure relates generally to information technology (IT) management. More specifically, this disclosure relates to systems, methods, and graphical user interfaces (GUIs) for electronically managing IT infrastructure such as, but not limited to, hardware devices or the like.

BACKGROUND

An organization, such as a retailer, can have a network of locations (e.g., retail stores, etc.) that are distributed geographically. In some cases, a retailer may have a network of retail stores that includes hundreds, or even thousands, of retail stores located worldwide. The network of retail stores can, for example, include a variety of infrastructure to function. Part of that infrastructure can include a variety of hardware devices (e.g., sales registers, servers, wireless network routers, printers, mobile devices, or the like) and software (e.g., for the sales registers to function, installed on the mobile devices, inventory management, or the like). These hardware devices and the software running thereon may malfunction.

SUMMARY

This disclosure relates generally to information technology (IT) management. More specifically, this disclosure relates to systems, methods, and graphical user interfaces (GUIs) for electronically managing IT infrastructure such as, but not limited to, hardware devices or the like.

A computer-implemented method for visually tracking information technology (IT) incidents across a network of retail stores via a graphical user interface (GUI) on a display of a user device is disclosed. The method includes, via an IT manager that is accessible from the user device, receiving, from the user device, a store identifier; determining one or more IT incidents based on the store identifier; and via an application running on the user device, displaying on the display of the user device, a status of the one or more IT incidents based on the store identifier.

A system is disclosed. The system includes a mobile device application that is loadable onto a mobile device having a display screen. When loaded onto the mobile device, the mobile device application permits the mobile device to communicate with at least one server to send to the server a location identifier and to receive from the server information technology (IT) asset information associated with the location identifier, and to cause display of selectable images defining the IT asset information for the location identifier. The system further includes at least one server remote from the mobile device on which the mobile application is loaded and that is able to communicate with the mobile device. The at least one server is configured to receive the location identifier from the mobile device, determine IT asset information from the received location identifier, and send IT asset information to the mobile device application.

BRIEF DESCRIPTION OF THE DRAWINGS

References are made to the accompanying drawings that form a part of this disclosure and which illustrate embodiments in which the systems and methods described in this specification can be practiced.

Like reference numbers represent like parts throughout.

DETAILED DESCRIPTION

Figure 1:
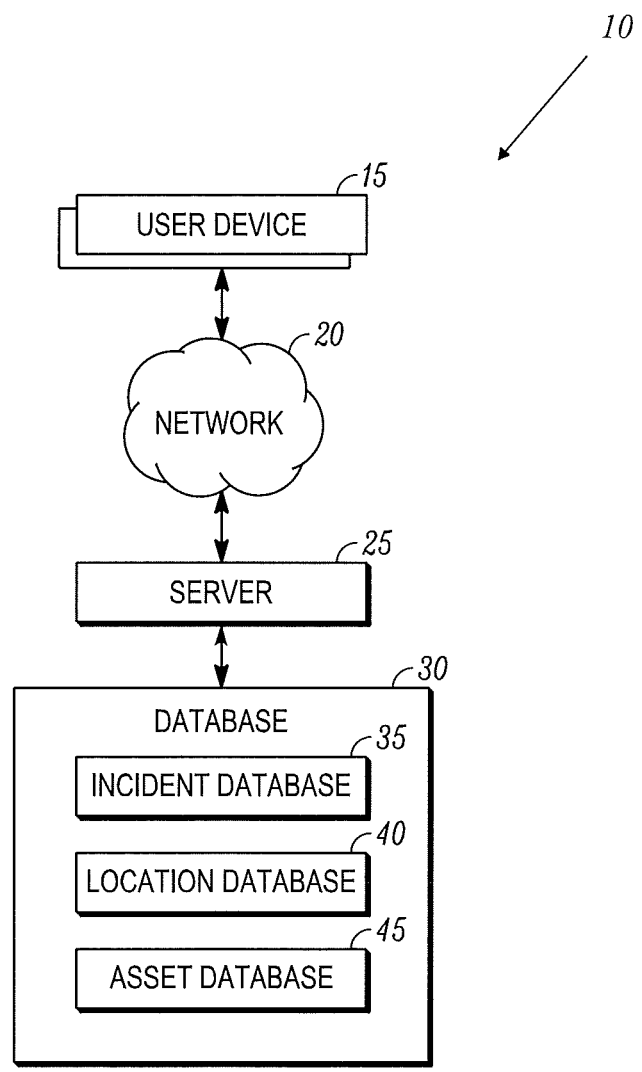
FIG. 1 is a schematic diagram of a system for implementing the IT management system, methods, and GUIs described in this specification, according to an embodiment.

This disclosure relates generally to information technology (IT) management. More specifically, this disclosure relates to systems, methods, and graphical user interfaces (GUIs) for electronically managing IT infrastructure such as, but not limited to, hardware devices or the like.

Typically, when a user at a location, such as a retail store, that is part of a larger network of locations, such as a network of retail stores for a retailer, faces an IT incident (e.g., network connectivity errors, printer errors, cash register errors, etc.), the user may place a call to an IT helpdesk. Often, the call to the IT helpdesk can include a period of time in which the user waits on hold for an IT representative to provide assistance. In some cases, for a single IT incident, multiple users may call the IT helpdesk to report and/or resolve the incident. In such cases, multiple users may spend time on hold waiting for an IT representative. The time spent waiting, as well as a cost for the call, can be significant depending upon a number of locations in the network. Embodiments described in this specification are directed to reducing a number of calls to the IT helpdesk and an amount of time and cost associated with such calls.

A network of locations, as used in this specification, includes a plurality of locations owned and/or operated by an organization. In an embodiment, the network of locations can include locations that are distributed geographically. In an embodiment, the network of locations can include hundreds or thousands of locations nationwide or worldwide. The examples described are not intended to be limited to a particular geographical region or to a particular number of locations. It will be appreciated that the embodiments described in this specification are applicable to a single location in addition to a network of locations. In an embodiment, an amount of effort in electronically managing IT infrastructure may be reduced by a relatively larger amount when a number of locations is greater than one.

A network of retail stores, as used in this specification, includes a network of locations in which the locations are retail stores and the organization is a retailer. In an embodiment, the network of retail stores can also include locations that are not retail stores. For example, the network of retail stores can include one or more retail stores and one or more distribution centers, fulfillment centers, and/or flow centers via which inventory is provided to the one or more retail stores.

A user, as used in this specification, includes an individual at a location that is part of a larger network of locations. In an embodiment, the location is a retail store that is part of a network of retail stores of a retailer. In an embodiment, the user is an employee or contractor of the retailer.

A button, as used in this specification, is not intended to include a particular structure. A button can generally include an area that is selectable and which can, for example, include a hyperlink or the like to cause a display change to a GUI.

It will be appreciated that a button can alternatively be implemented as a hyperlink or the like.

A local incident, as used in this specification, includes an incident that affects a user's location.

A global incident, as used in this specification, includes an incident that affects a plurality of locations. In an embodiment, a percentage of locations impacted may be greater than, for example, 20% for an incident to be considered a global incident. It will be appreciated that the criteria for determining whether an incident is a global incident can vary according to the type of incident. For example, if a number of stores (e.g., 50 out of 1,500) is experiencing slowness on some devices (e.g., mobile devices used by employees, etc.), the issue may not be identified as a global incident. However, if fewer stores (e.g., 30 out of 1,500) are experiencing cash register outages, the incident may be identified as a global incident, even though a percentage of stores impacted is lower than the slow device example. In an embodiment, an issue type may be associated with a severity, which may be used to determine whether the incident is a global incident.

FIG. 1 is a schematic diagram of a system 10 for implementing the system, methods, and GUIs for electronically managing IT infrastructure as described in this specification, according to an embodiment. The system 10 can be used to, for example, provide a means by which a user can troubleshoot an IT incident, review IT incidents that are already identified, and/or identify an IT incident to an IT group to resolve the IT incident.

The system 10 includes a server 25 in communication with a user device 15 via a network 20. The illustrated embodiment shows a plurality of user devices 15. It will be appreciated that the number of user devices 15 can vary. For example, in an embodiment, there can be a single user device 15 or, in an embodiment, there can be two or more user devices 15. It will be appreciated that the number of servers 25 can also vary. For example, in an embodiment there can be two or more servers 25. The server 25 can make the IT management system described in this specification available to the user device 15. The server 25 can make the IT management system available to the user device 15 via the network 20. In an embodiment, the server 25 can make one or more GUIs (e.g., the GUIs shown and described in accordance with FIGS. 2A-2M below) for the IT management system available to the user device 15.

It will be appreciated that the GUIs may be made available by one or more servers (not shown in FIG. 1) that are separate from the server 25. In an embodiment, aspects of the server 25 can be the same as or similar to aspects of the server device 535 shown and described in accordance with FIG. 3 below.

In an embodiment, the network 20 is representative of the Internet. In an embodiment, the network 20 can include, for example, a local area network (LAN), a wide area network (WAN), a wireless network, a cellular data network, or the like. In an embodiment, aspects of the network 20 can be the same as or similar to aspects of the network 540 as shown and described in accordance with FIG. 3 below.

Examples of the user device 15 include, but are not limited to, a personal computer (PC), a laptop computer, a mobile device (e.g., a smartphone, a personal digital assistant (PDA), a tablet-style device, etc.), a wearable mobile device (e.g., a smart watch, head wearable device, etc.), or the like. The user device 15 generally includes a display device and an input device. A GUI for the IT management system can be displayed on the display device of the user device 15.

Examples of the display device for the user device 15 include, but are not limited to, a monitor connected to a PC, a laptop screen, a mobile device screen, a tablet screen, or the like. In an embodiment, aspects of the user device 15 can be the same as, or similar to, aspects of user devices 501 as shown and described in accordance with FIG. 3 below. In an embodiment, the user device 15 may be able to access the server 25 via the network 20 when the user device 15 is in a particular location, such as in one of the locations of the network of locations (e.g., in a retail store). In an embodiment, this can be referred to as when the user device 15 is on premises. In an embodiment, the user device 15 may not be able to access the server 25 via the network 20 when the user device 15 is not in the particular location. This can be referred to as when the user device 15 is off premises. In an embodiment, a security of the system 10 may be relatively greater by disabling the access to the server 25 if the user device 15 is off premises as this may, for example, be an indication that the user device 15 has been improperly removed from the location.

In an embodiment, the user device 15 may be able to access the server 25 so long as the user device is authenticated via a secure network. For example, if the user is logged into a secure network using, for example, the user's credentials as an employee, (e.g., a Single Sign On (SSO)), the user can have access to the server 25 and correspondingly to the database 30. In an embodiment, the user can log in to the device 15 (and accordingly the secure network) with a username and password and access data in the system 10 regardless of location. In an embodiment, the user can be authenticated using, for example, a thumbprint, facial recognition, or the like available from the user device 15. For example, the user can be at home and have access to the system 10 as long as the user is logged in with her credentials and is connected to the secure network (e.g., via a virtual private network (VPN) or the like). In an embodiment, a user such as, but not limited to, a vendor, can be provided with a username and password to access data in the system 10. In such an embodiment, the vendor may be able to see locations and data relevant to the hardware and/or software information that the particular vendor is responsible for maintaining. For example, a vendor may be responsible for maintaining all printers in a subset of locations (e.g., in one city or the like). In such a case, the vendor may be able to log in to the system 10 and access data related to the printers in that assigned location.

The server 25 is in communication with a database 30. The database 30 can include a variety of information related to the IT status of stores of the retailer, hardware and/or software information, or the like. For example, in an embodiment, the database 30 can include an incident database 35, a location database 40, an asset database 45, or the like. It will be appreciated that the database 30 is intended as an example and that other configurations for the database 30 are possible. For example, there can be a plurality of databases 30, according to an embodiment.

The database 30 and the corresponding components (e.g., incident database 35, location database 40, and asset database 45, etc.) are not intended to reflect a particular database format or structure. In an embodiment, fewer and/or additional databases can be included in the system 10. The incident database 35 can include a variety of information about current IT incidents. For example, the incident database 35 can include one or more entries including information about each incident. The information can include, for example, an incident title, an incident time of logging, an incident estimated time of resolution, an incident summary, a user ID of the user reporting the incident, or the like. It will be appreciated that additional information can be included, such as, for example, a number of locations impacted or the like. The location database 40 can include a variety of information about the locations in the network of locations. The asset database 45 can include a variety of information about various IT assets of the retailer. In an embodiment, when a new incident is entered into the incident database 35, the server 25 can send an alert or notification of the new incident to the user device 15 via the network 20. In an example, the alert from the server 25 can cause the user device 15 to display a popup message, vibrate, play a sound, or other audible or visible notification on the user device 15.

FIGS. 2A-2M are schematic diagrams of graphical user interfaces (GUIs) 50A-50M for the IT management system as described in this specification, according to an embodiment. It will be appreciated that the GUIs 50A-50M are examples and can include additional or less information than is shown in FIGS. 2A-2M. It will be appreciated that the text and images are representative and can be modified within the scope of the description included in this specification.

Depending on a user's role, the user can be given different privileges within the IT management system. For example, a manager may be able to report incidents. A user that is not a manager may have reduced privileges and may be able to review incidents, but may not be able to report incidents. In such an embodiment, the GUI 50 may not include portions shown and described below. Enabling such privileges can, for example, enable users who may be impacted by (e.g., retail store employees) to view the incidents to see when there may be impacts to the user's store.

Figure 2A:
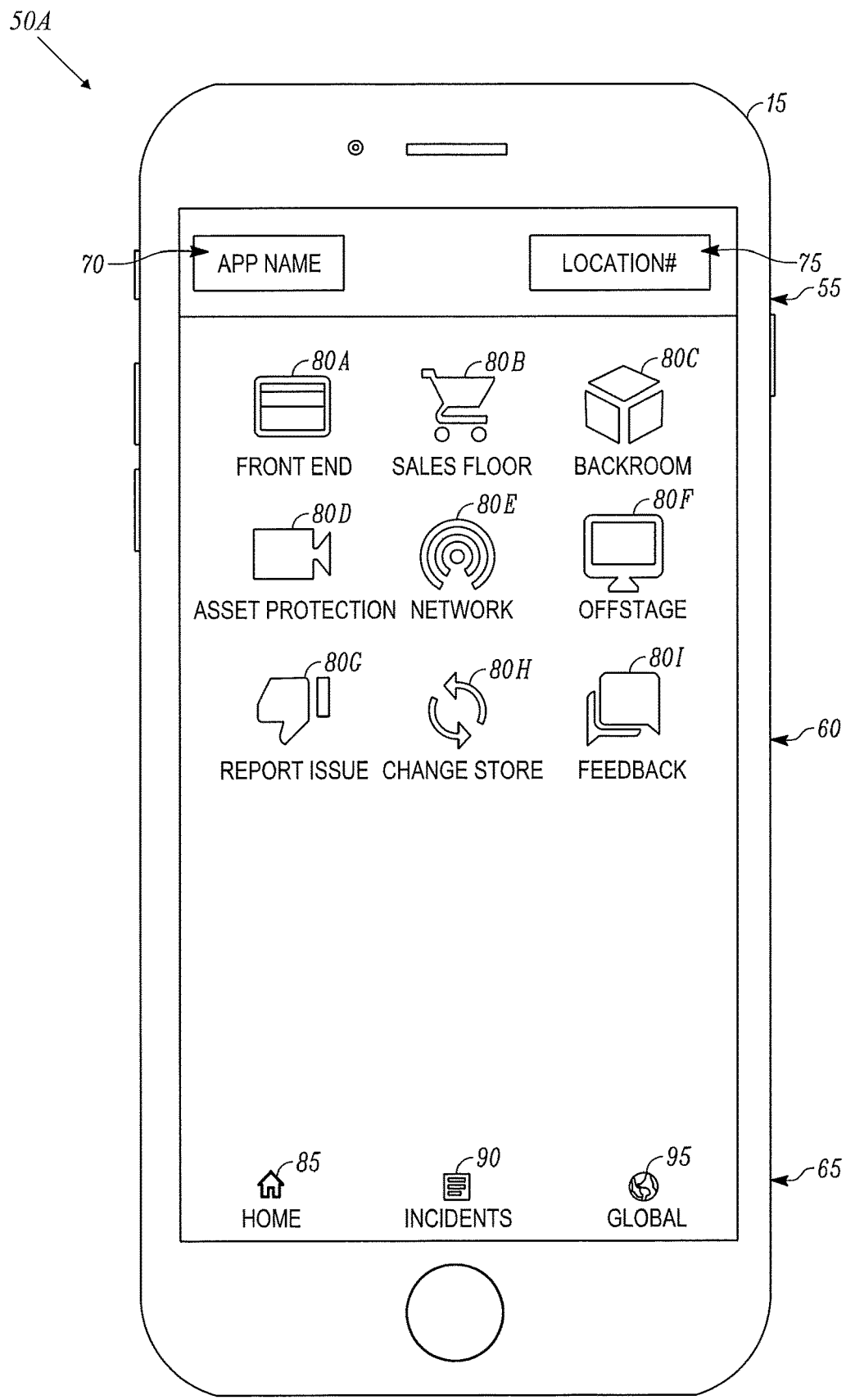
FIGS. 2A-2M are schematic diagrams of graphical user interfaces (GUIs) for the IT management system as described in this specification, according to an embodiment.

FIG. 2A is a schematic diagram of a user interface 50A, according to an embodiment. The user interface 50A can, for example, be representative of a home screen or initial page of the IT management system described in this specification. The user device 15 in the illustrated embodiment is a smartphone. It will be appreciated that the user device 15 is intended as an example and that other types of user devices 15 as described in this specification may be utilized to display the user interface 50A.

The user interface 50A includes a header 55, body 60, and footer 65. It will be appreciated that the text and images shown in the illustrated embodiment are intended as examples and that the text and images can vary according to the principles described in this specification.

The header 55 can include an application name 70 and a location number 75. The application name 70 can be representative of the IT management system, according to an embodiment. Alternatively, the application name 70 can be replaced by an indication of which interface is being displayed for the application. For example, the application name 70 can be replaced by an interface title such as "Home" in the illustrated embodiment. The location number 75 can be representative of a location for which the user is associated. The location number 75 can be based on a user's login information that may be input before the user can run the IT management system on the user device 15. For example, if the user is an employee at location #1, then the location number 75 can be displayed as Location 1. It will be appreciated that the location number 75 can alternatively be another type of location identifier such as, but not limited to, a code, an alphanumeric identifier, an image, or the like.

The body of the user interface 50A includes a plurality of selectable buttons 80A-80I. The buttons 80A-80I are representative of various actions that a user can complete. It will be appreciated that fewer or additional buttons than the buttons 80A-80I can be included in the user interface 50A.

The buttons 80A-80I are selectable such that the user can, for example, view incidents related to particular areas of the location (e.g., front end button 80A, sales floor button 80B, etc.), report an incident (e.g., report incident button 80G), change a location (e.g., change store button 80H), provide feedback (e.g., feedback button 80I), or the like. As described above, different users may have different privileges, and accordingly, may see different buttons 80A-80I. For example, if the user manages more than one store or is otherwise associated with more than one store, the user may be presented with the change store button 80H. For example, members of a corporate office may also be presented with the change store button 80H. However, if the user is an employee at a single store, the user may not be able to change locations, and accordingly, the change store button 80H may not be visible to such a user.

The footer 65 includes a plurality of buttons 85-95. The buttons 85-95 include a home button 85, an incidents button 90, and a global button 95. It will be appreciated that the text and/or images associated with the buttons 85-95 can vary. It will also be appreciated that the footer 65 can include one or more additional (or different) buttons. For example, the footer 65 can include a "voice" button (e.g., a microphone, etc.), that enables a user to provide inputs via a microphone. The home button 85 may return a user to the user interface 50A, regardless of from which user interface the home button 85 is selected. The incidents 85 can cause the display of all local incidents (e.g., user interface 50B shown and described in accordance with FIG. 2B below). The global button 90 can cause the display of all global incidents (e.g., user interface 50C shown and described in accordance with FIG. 2C below). It will be appreciated that the footer 65 can include one or more additional buttons. For example, the footer 65 could include a sign out button (not shown) that can sign the user out of the IT management system.

It will be appreciated that the header 55 and footer 65 can include additional buttons. It will also be appreciated that buttons included in the header 55 can alternatively be presented in the footer 65 or that buttons included in the footer 65 can alternatively be presented in the header 55.

Figure 2B:
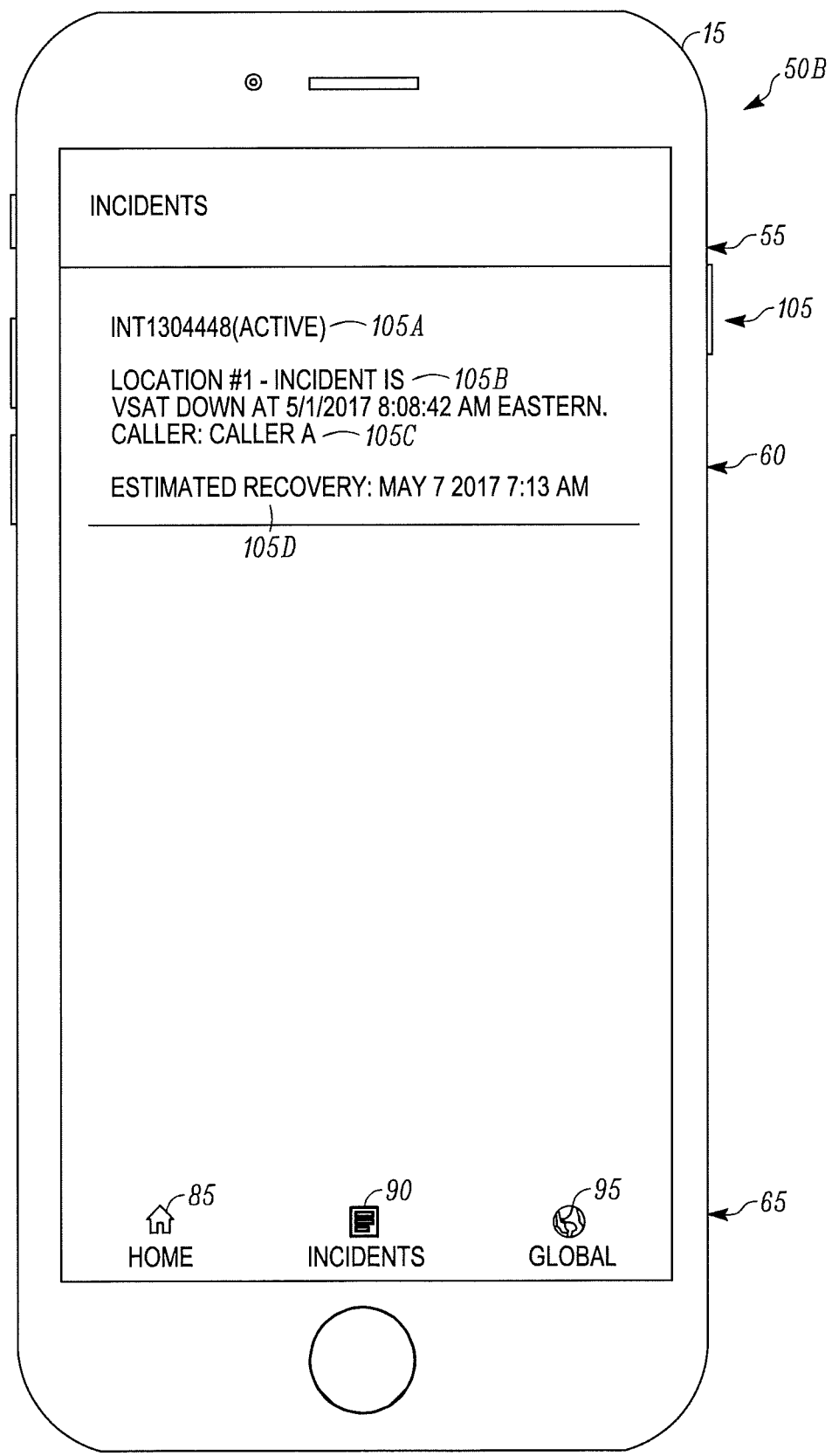

FIG. 2B is a schematic diagram of a user interface 50B, according to an embodiment. The user interface 50B can be, for example, representative of an interface in which a user can see all active incidents. In an embodiment, the user interface 50B may be limited to displaying incidents that are considered to be local incidents. In an embodiment, the user interface 50B can display local incidents as well as global incidents that have been identified as affecting the user's location. That is, if a global incident has been linked to the user's location, the user interface 50B can display the global incident as well. In an embodiment, a user may navigate to the user interface 50B by selecting the incidents button 90 from the footer 65 of any of the user interfaces 50A-50M.

In the user interface 50B, the header 55 can include an identifier 100. In the illustrated embodiment, the identifier 100 indicates that the user interface 50B is for "Incidents." It will be appreciated that the text can vary and could, for example, be "Local Incidents" or the like.

The body 60 of the user interface 50B includes a listing of local incidents 105. The listing of local incidents 105 can be limited to incidents that are currently active. That is, the listing of local incidents 105 can be limited to incidents that are yet to be resolved. In an embodiment, the listing of local incidents 105 can also include incidents that are not currently active (e.g., incidents which have been resolved). In such an embodiment, the inactive incidents may be listed at a bottom of the listing of local incidents 105. In an embodiment, inactive incidents may be limited to those incidents which have been resolved within a recent period of time, such as the current day, current week, or the like.

The listing of local incidents 105 can include a plurality of incidents, though a single representative incident is illustrated. The listing of local incidents 105 can be sorted, for example, based on priority, estimated time to recovery, or the like. Each of the incidents in the listing of local incidents 105 can include a variety of information that is descriptive of the incident. For example, the listing can include an incident title 105A, an incident summary 105B, an identification 105C of the user that reported the incident, and an estimated time to recovery 105D. It will be appreciated that each of the listings can include additional information descriptive of the incident. In an embodiment, when an incident is resolved, the incident may be automatically removed from the user interface 50B.

Figure 2C:
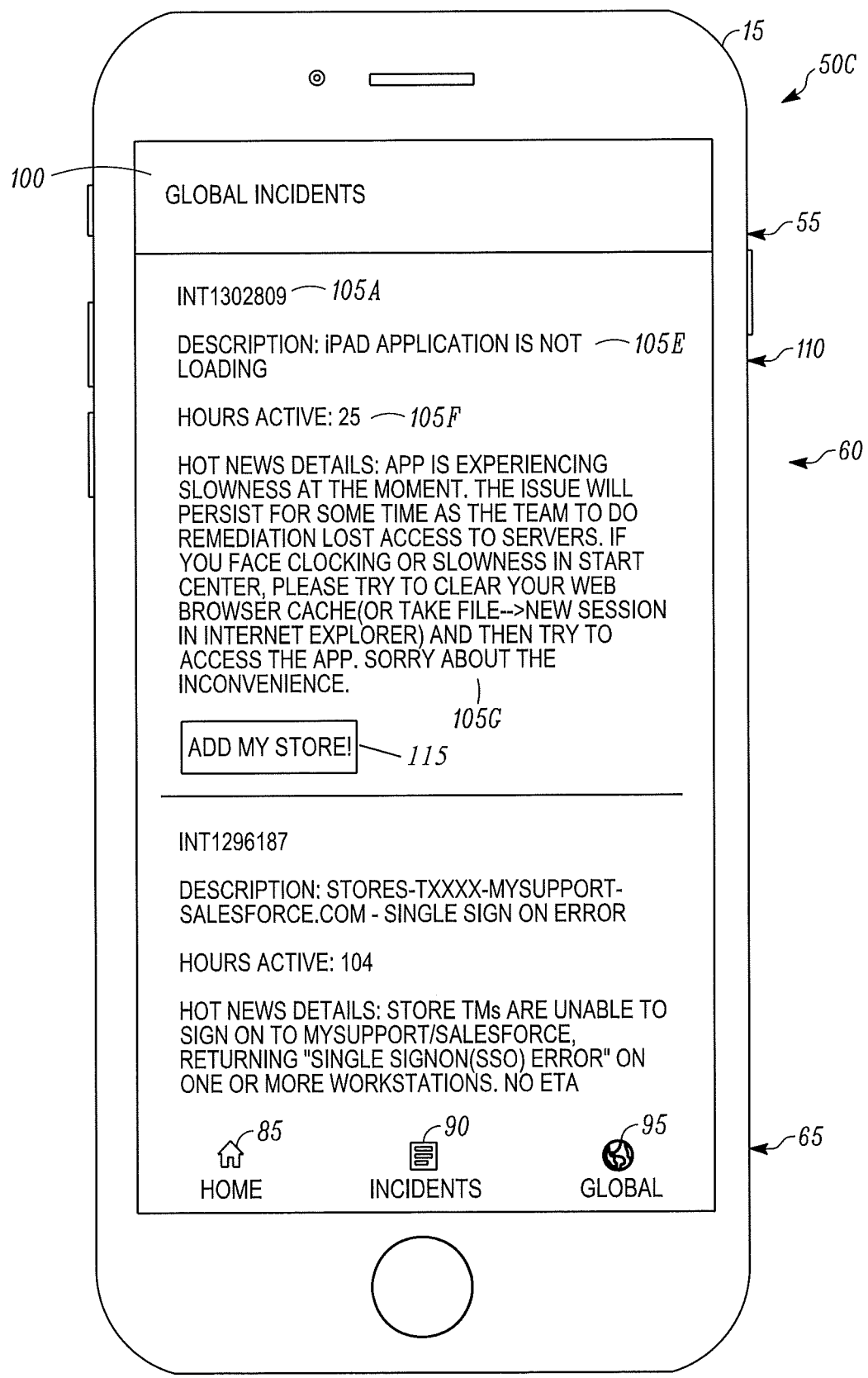

FIG. 2C is a schematic diagram of a user interface 50C, according to an embodiment. The user interface 50C can be, for example, representative of an interface in which a user can see all active global incidents. The user interface 50C may be limited to displaying incidents that are considered to be global incidents. In an embodiment, a user may navigate to the user interface 50C by selecting the global button 90 from the footer 65 of any of the user interfaces 50A-50M.

The header 55 can include an identifier 100 for the user interface 50C. In the illustrated embodiment, the identifier 100 indicates that the user interface 50C is for "Global Incidents." It will be appreciated that the text can vary.

The body 60 of the user interface 50C includes a listing of global incidents 110. The listing of global incidents 110 can be limited to incidents that are currently active. That is, the listing of global incidents 110 can be limited to incidents that are yet to be resolved. In an embodiment, the listing of global incidents 110 can also include incidents that are not currently active (e.g., incidents which have been resolved). In such an embodiment, the inactive incidents may be listed at a bottom of the listing of global incidents 110. In an embodiment, inactive incidents may be limited to those incidents which have been resolved within a recent period of time, such as the current day, current week, or the like.

The listing of global incidents 110 can include one or more global incidents. It will be appreciated that the listing of global incidents 110 can be blank when there are no active global incidents. The listing of global incidents 110 can be sorted, for example, based on priority, time since the incident was first logged, estimated time to recovery, or the like. Each of the incidents in the listing of local incidents 110 can include a variety of information that is descriptive of the incident. For example, the listing can include an incident title 105A, an incident summary 105E, a duration of which the incident has been active 105F, and additional notes 105G. The additional notes 105G can include a variety of information including, but not limited to, updates about the incident and its resolution, tips for resolving the incident, or the like. It will be appreciated that each of the listings can include additional information descriptive of the incident. In an embodiment, when an incident is resolved, the incident may be automatically removed from the user interface 50C.

Each of the global incidents in the listing of global incidents 110 can also include a button 115. The button 115 can enable a user to indicate that the user's location is also impacted by the global incident. As a result, an IT department can accurately track a number of locations impacted by the incident. This can, for example, help the IT department with prioritizing various global incidents. In an embodiment, if the user's location has already been linked with the global incident (e.g., another user has reported the incident, etc.); the button 115 may not be visible.

Figure 2D:
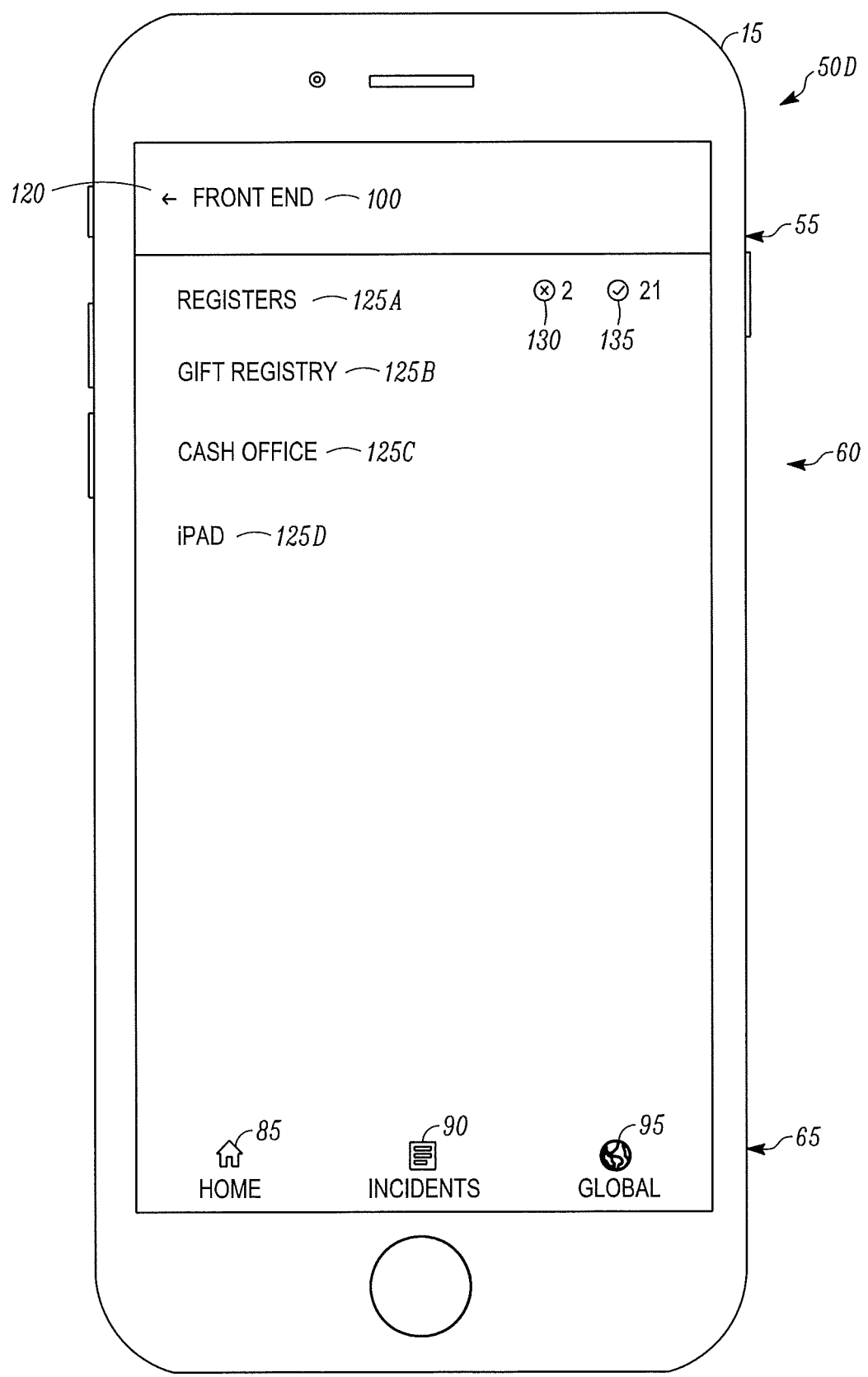

FIG. 2D is a schematic diagram of a user interface 50D, according to an embodiment. The user interface 50D can be, for example, representative of an interface in which a user can review status of front end assets. It will be appreciated that front end is an example of a grouping of the assets and that the grouping can be referred to alternatively as Grouping A, Category A, or the like. Assets can be identified as belonging to the front end category in, for example, the asset database 45 (FIG. 1). In an embodiment, a user may navigate to the user interface 50D by selecting the button 80A (FIG. 2A). In the illustrated embodiment, the front end assets include cash registers, gift registry, cash office, and iPad.

The header 55 can include the identifier 100. In the illustrated embodiment, the identifier 100 indicates that the user interface 50D is for "Front End" assets. It will be appreciated that the text can vary. The header 55 can also include a button 120. The button 120 can be selected to return a user to a previous page. For example, if the user selects the button 120 in the user interface 50D, the user may be returned to the user interface 50A.

The body 60 of the user interface 50D includes a listing of asset categories included in the particular selection. For the front end assets, the category listing includes registers 125A, gift registry 125B, cash office 125C, and iPad 125D. It will be appreciated that these asset categories 125A-125D can vary. For each of the categories 125A-125D, an incident indicator 130 and an active indicator 135 can be included. In the illustrated embodiment, these indicators 130, 135 are shown for the registers 125A. The incident indicator 130 illustrates that there are two incidents for the registers at the user's location. The active indicator 135 illustrates that the remaining 21 registers do not have active incidents. Each of the categories 125A-125D can be a button that is selectable so that the user can view additional information in the category. For example, if the user selects the registers 125A, then the user interface 50E (FIG. 2E) may be displayed on the user device 15.

Figure 2E:
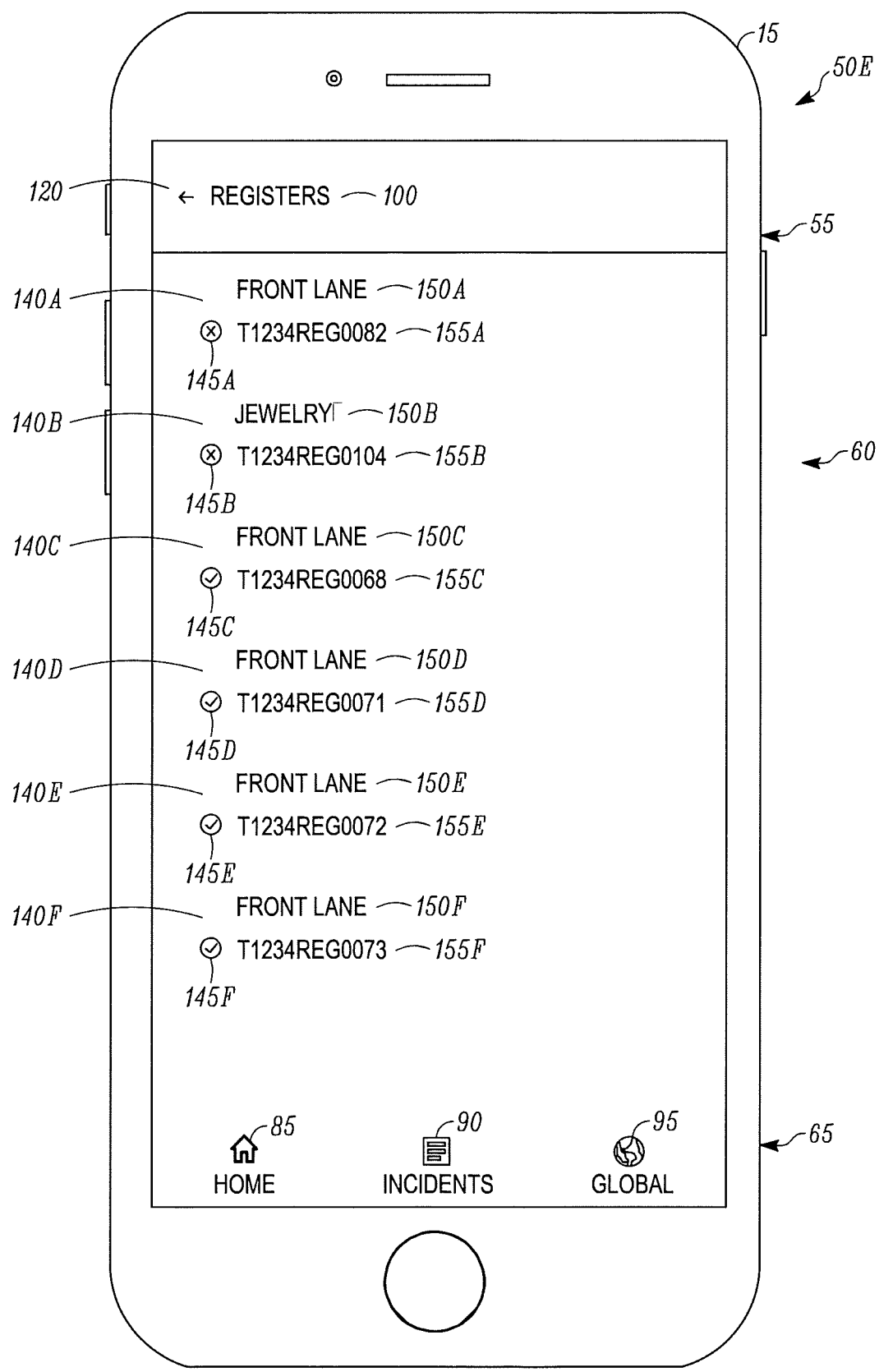

FIG. 2E is a schematic diagram of a user interface 50E, according to an embodiment. The user interface 50E can be, for example, representative of an interface in which a user can review status of all assets within a particular category listing (e.g., categories 125A-125D in FIG. 2D). In the illustrated embodiment, the user interface 50E is displaying status of registers (as selected from registers 125A in FIG. 2D).

The header 55 can include the identifier 100 indicating that the user interface 50E is for "Registers." It will be appreciated that the text can vary. The header 55 can also include the button 120 for navigating to a previous user interface. For example, if selected from the user interface 50E, the user interface 50D may be displayed on the user device 15.

The body 60 of the user interface 50D includes an entry 140A-140F for each of the registers in the category 125A. It will be appreciated that additional registers may be displayed by, for example, scrolling down on the user interface 50D. The entries 140A-140F can be ordered such that any register with an active incident is displayed at a top of the list. For example, in the illustrated embodiment, the register 140A and the register 140B can have some incident.

Each of the entries 140A-140F can include an indicator 145A-145F, a descriptor 150A-150F, and an asset ID 155A-155F. The indicators 145A-145F can match the incident indicator 130 (FIG. 2D) or the active indicator 135 (FIG. 2D). The descriptor 150A-150F can be representative of, for example, a location at which the register 140A-140F is located within the store. For example, the register 140B is located in a jewelry section of the store. The asset ID 155A-155F can be a hardware device indicator associated with the particular asset.

In an embodiment, each of the entries 140A-140F may be selectable such that a user can view additional information about the status of the selected entry. For example, the user may select the entry 140B to view additional details about the incident impacting the register T1234REG0104 (see FIG. 2F).

Figure 2F:
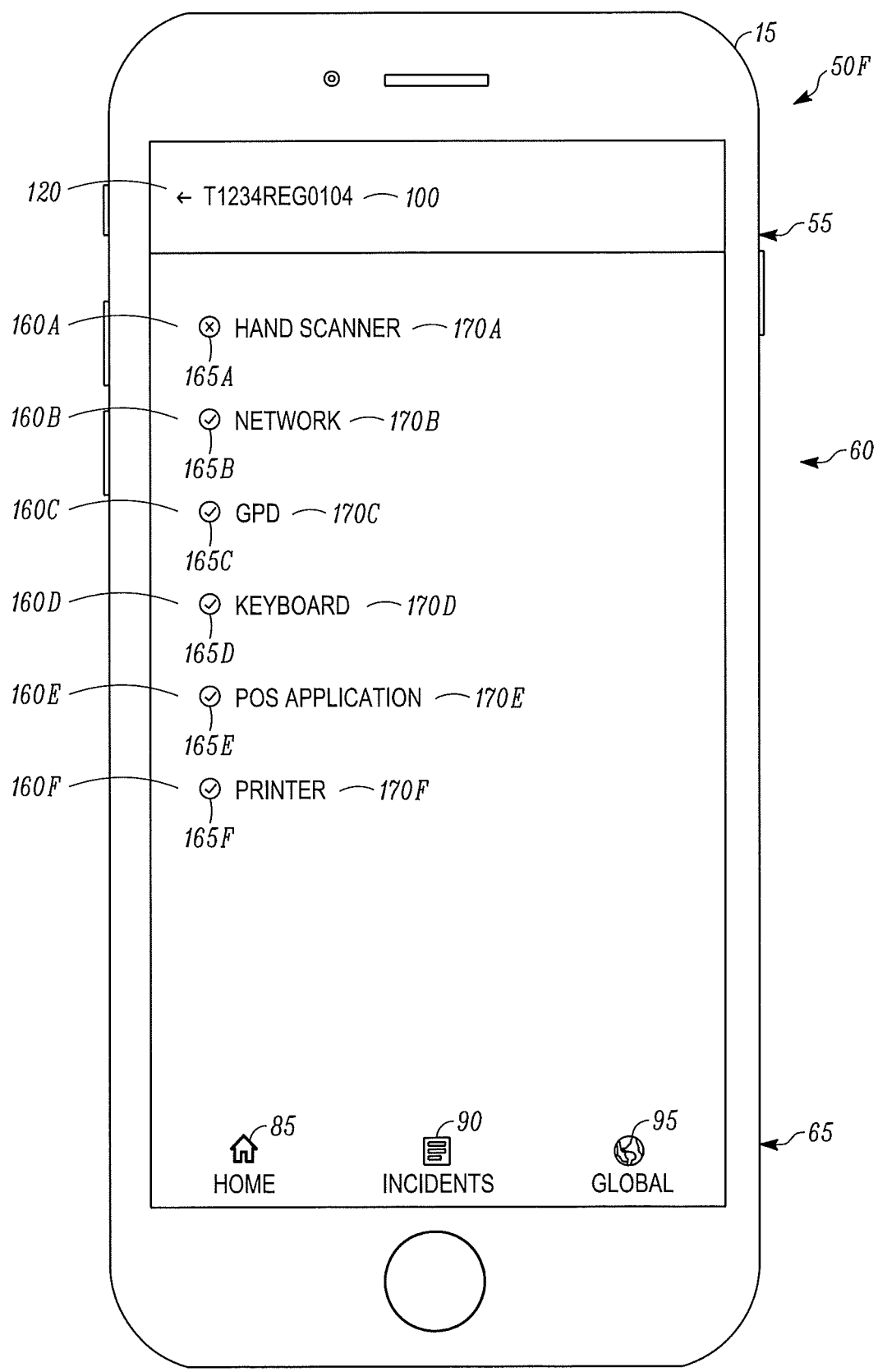

FIG. 2F is a schematic diagram of a user interface 50F, according to an embodiment. The user interface 50F can be, for example, representative of an interface in which a user can see additional information about an incident that is impacting a particular asset (e.g., register T1234REG0104).

The header 55 can include identifier 100 indicating that the user interface 50F is for "T1234REG0104." It will be appreciated that the text can vary. The header 55 can also include a button 120. The button 120 can be selected to return a user to a previous page. For example, if the user selects the button 120 in the user interface 50F, the user may be returned to the user interface 50E.

The body 60 of the user interface 50F includes a listing of assets associated with register T1234REG0104. In the illustrated embodiment, the register T1234REG0104 includes assets 160A-160F. It will be appreciated that the number of assets for the register T1234REG0104 can vary. For example, in an embodiment, the register T1234REG0104 can include a second hand scanner, or the like. Each asset 160A-160F is identified by a status indicator 165A-165F and an asset name 170A-170F. For example, the register T1234REG0104 includes a hand scanner asset 160A, where the indicator 165A indicates that the hand scanner has an active incident, and additional assets 160B which do not have an active incident. The status indicators 165A-165F generally provide a pictorial representation of a status of the asset so that the user can quickly identify which assets of the register T1234REG0104 are not functioning properly. In an embodiment, the assets 160A-160F can be displayed such that assets with an active incident (e.g., similar to asset 160A) are displayed first. In an embodiment, the assets 160A-160F may be selectable buttons such that the user can select one of the assets 160A-160F to view additional information. For example, if the user selects the asset 160A, the user may be presented with additional details about the incident and possible tips for resolving the incident.

Figure 2G:
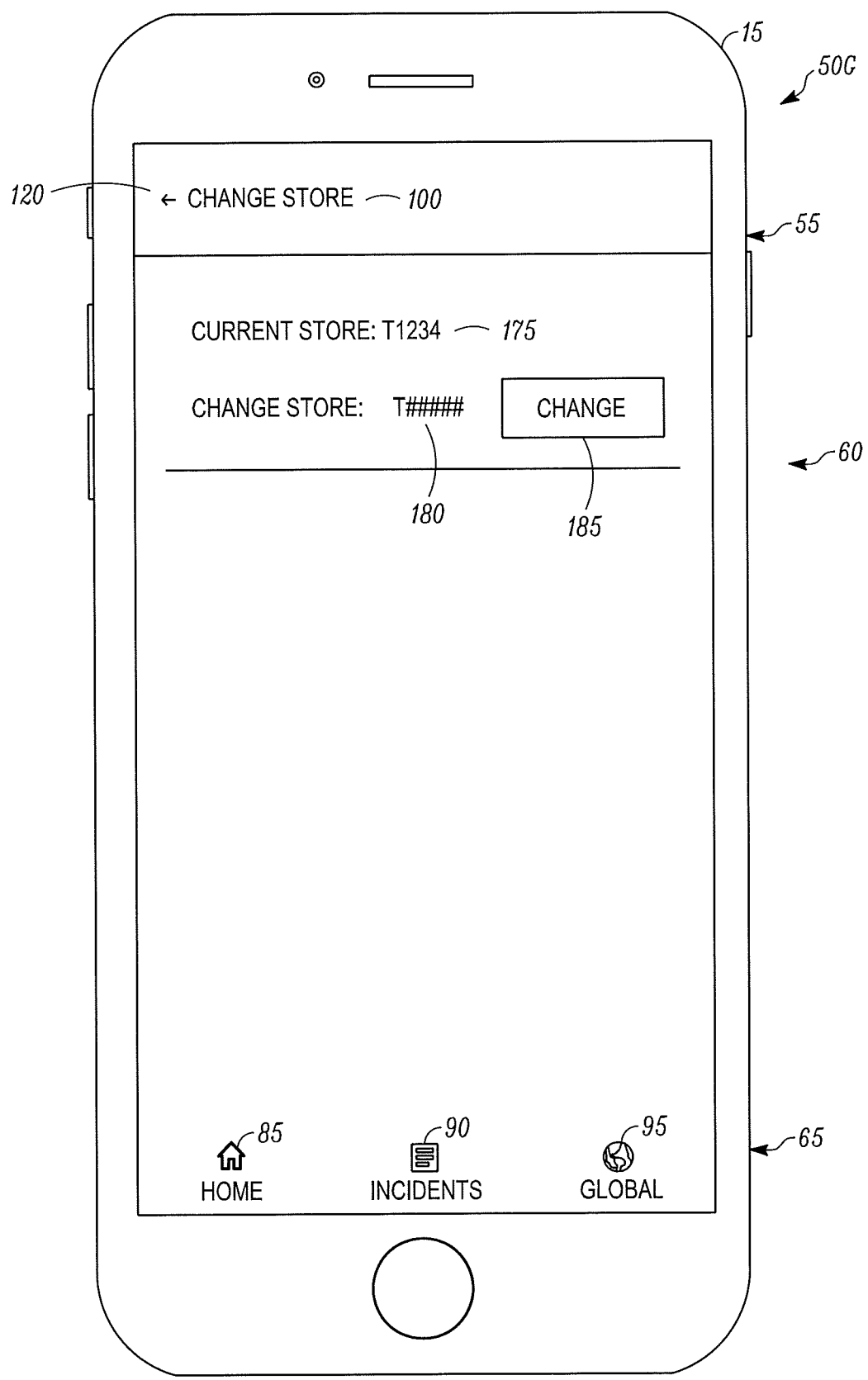

FIG. 2G is a schematic diagram of a user interface 50G, according to an embodiment. The user interface 50G can be, for example, representative of an interface in which a user can select to change to a different location (e.g., a different store).

The header 55 can include an identifier 100 for the user interface 50G. In the illustrated embodiment, the identifier 100 indicates that the user interface 50G is to "Change Store." It will be appreciated that the text can vary. The user interface 50G additionally includes a button 120 which, when selected, can return a user to the previous user interface. For example, the user may select button 80H on the user interface 50A to navigate to the user interface 50G. Accordingly, if the user selects the button 120, the user interface 50A can then be displayed on the user device 15.

The body 60 of the user interface 50G includes a current store indicator 175, a change store input 180, and a change button 185. In an embodiment, the user may be able to view incidents at various stores. In such an embodiment, the user may be able to enter a store number into the store input 180 that is different from the store listed via the current store indicator 175. Once the user has entered the store number into the store input 180, the user can select the change button 185 to change stores. In response to selecting the change button 185, the user may be forwarded to the user interface 50A, with the location number and information displayed being based on the newly entered store number. In an embodiment, the IT management system may confirm that the user has privileges to view the information at the new store. If not, the user may be presented with an error message. In an embodiment, the IT management system may display the user interface 50A without confirming the user's privileges. That is, in an embodiment, there may be no limitation to which stores a user can select.

Figure 2H:
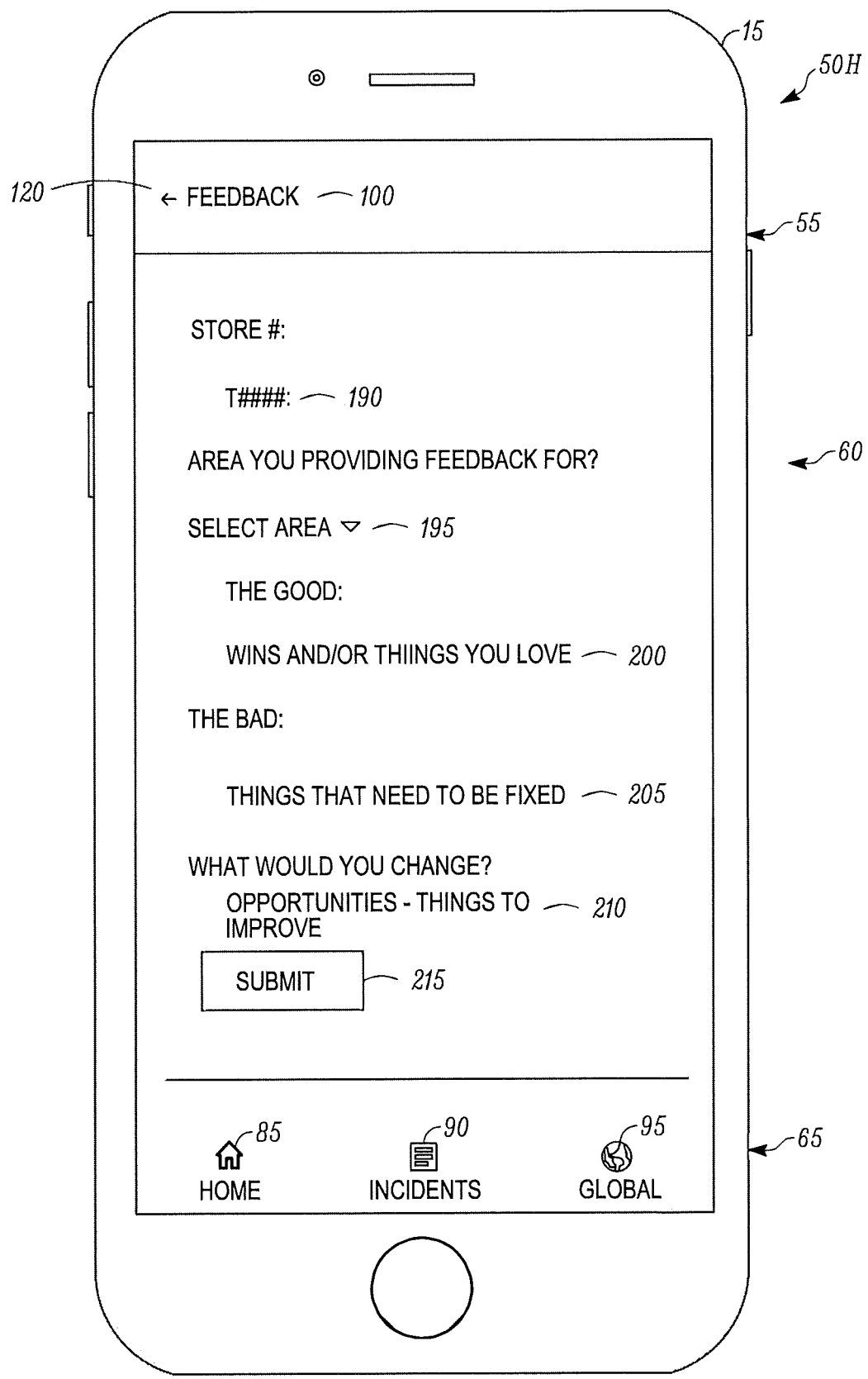

FIG. 2H is a schematic diagram of a user interface 50H, according to an embodiment. The user interface 50H can be, for example, representative of an interface in which a user can provide feedback about the IT management system.

The header 55 can include an identifier 100 for the user interface 50H indicating that the user interface 50C is for "Feedback." It will be appreciated that the text can vary. The user interface 50H additionally includes a button 120 which, when selected, can return a user to the previous user interface. For example, the user may select button 80I on the user interface 50A to navigate to the user interface 50H. Accordingly, if the user selects the button 120, the user interface 50A can then be displayed on the user device 15.

The body 60 of the user interface 50H includes a plurality of inputs 190-210 via which the user can provide feedback to an IT department. For example, the user can enter the user's store number in input 190. In an embodiment, the input 190 can be automatically populated based on the user's login credentials. The input 195 may enable a user to select an area to which the user's feedback applies. For example, the areas can be, for example, usability, effectiveness, or the like. The user can then input positive feedback via input 200, negative feedback via input 205, and suggestions via input 210. It will be appreciated that the inputting of information can be performed by voice, typing, or the like. Once the user has completed the form, the user can select submit button 215 to cause the information to be provided directly to the IT department. In an embodiment, the user may receive a confirmation message or the like.

Figure 2I:
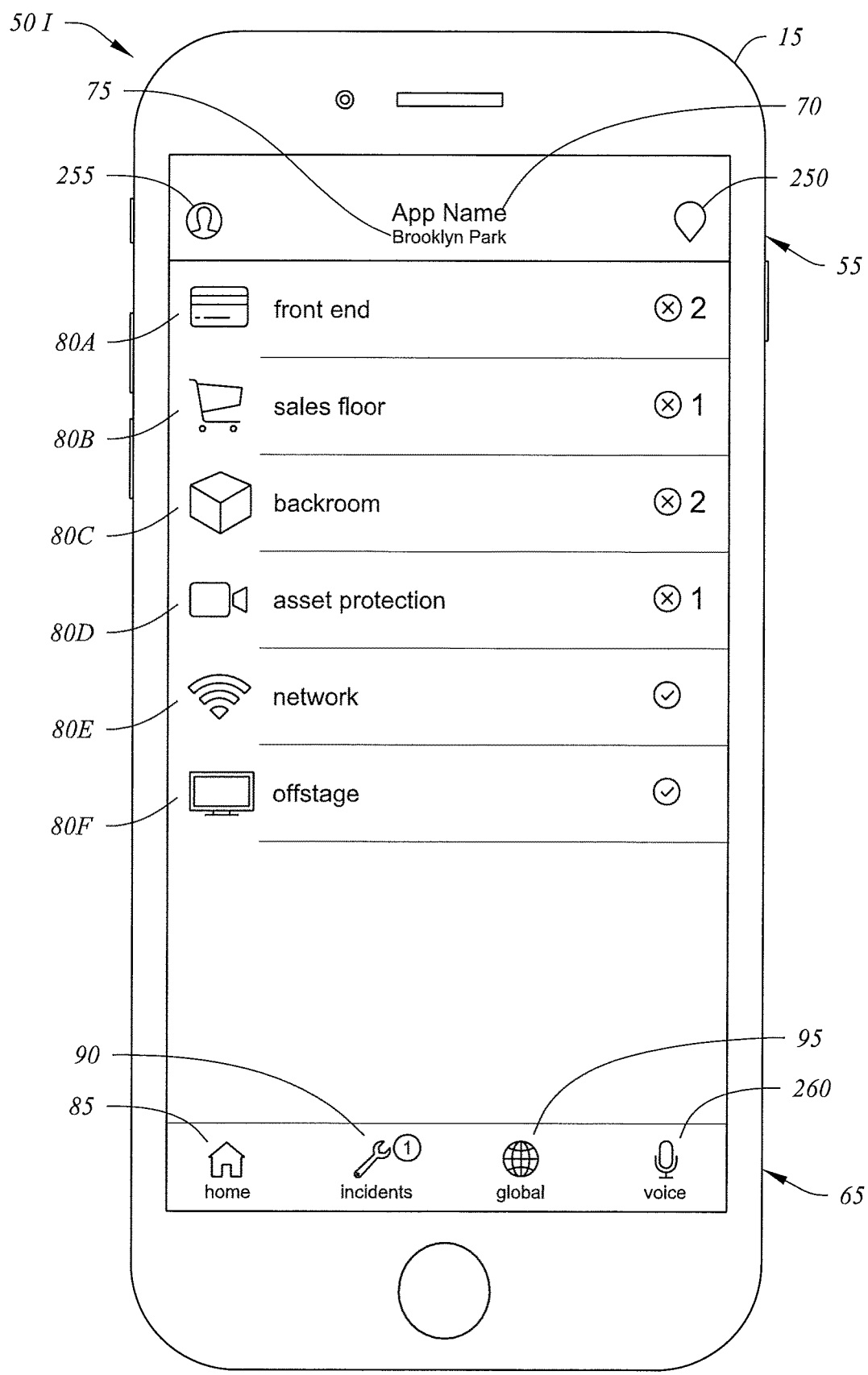

FIG. 2I is a schematic diagram of a user interface 50I, according to an embodiment. The user interface 50I can, for example, be representative of a home screen or initial page of the IT management system described in this specification. The user interface 50I can be an alternative home screen or initial page of the IT management system relative to the user interface 50A.

The user device 15 in the illustrated embodiment is a smartphone. It will be appreciated that the user device 15 is intended as an example and that other types of user devices 15 as described in this specification may be utilized to display the user interface 50I.

The user interface 50I includes a header 55, body 60, and footer 65. It will be appreciated that the text and images shown in the illustrated embodiment are intended as examples and that the text and images can vary according to the principles described in this specification.

The header 55 can include an application name 70, a location number 75, a location selector 250, and a user setting button 255.

The application name 70 can be representative of the IT management system, according to an embodiment. Alternatively, the application name 70 can be replaced by an indication of which interface is being displayed for the application. For example, the application name 70 can be replaced by an interface title such as "Home" in the illustrated embodiment. The location number 75 can be representative of a location for which the user is associated. The location number 75 can be based on a user's login information that may be input before the user can run the IT management system on the user device 15. For example, if the user is an employee at location #1, then the location number 75 can be displayed as Location 1. It will be appreciated that the location number 75 can alternatively be another type of location identifier such as, but not limited to, a code, an alphanumeric identifier, an image, or the like. In an embodiment, the location for the user may be a location which is geographically near the user at the time of using the user interface 50I. For example, the user device 15 may include a global positioning system (GPS) or the like which can be utilized to provide the user with information about a location that is nearest to the user. The locations may further be selectable based on the user's current location, as is shown in the user interface 50J shown and described in accordance with FIG. 2J below.

The body of the user interface 50I includes a plurality of selectable buttons 80A-80F. The buttons 80A-80F are representative of various actions that a user can complete. It will be appreciated that fewer or additional buttons than the buttons 80A-80F can be included in the user interface 50I. The buttons 80A-80F are selectable such that the user can, for example, view incidents related to particular areas of the location (e.g., front end button 80A, sales floor button 80B, etc.), or the like.

As described above, different users may have different privileges, and accordingly, may see different buttons 80A-80F.

The footer 65 includes a plurality of buttons 85, 90, 95, 260. The buttons 85, 90, 95 include a home button 85, an incidents button 90, and a global button 95. It will be appreciated that the text and/or images associated with the buttons 85-95 can vary. The footer 65 also includes a "voice" button 260 (e.g., a microphone, etc.), that enables a user to provide inputs via a microphone.

The home button 85 may return a user to the user interface 50I, regardless of from which user interface the home button 85 is selected. The incidents 90 can cause the display of all local incidents (e.g., user interface 50B shown and described in accordance with FIG. 2B). The global button 90 can cause the display of all global incidents (e.g., user interface 50C shown and described in accordance with FIG. 2C). The voice button 260 can enable a microphone of the user device 15 and cause the display of user interface 50L shown and described in accordance with FIG. 2L.

It will be appreciated that the footer 65 can include one or more additional buttons. For example, the footer 65 could include a sign out button (not shown) that can sign the user out of the IT management system.

It will be appreciated that the header 55 and footer 65 can include additional buttons. It will also be appreciated that buttons included in the header 55 can alternatively be presented in the footer 65 or that buttons included in the footer 65 can alternatively be presented in the header 55.

Figure 2J:
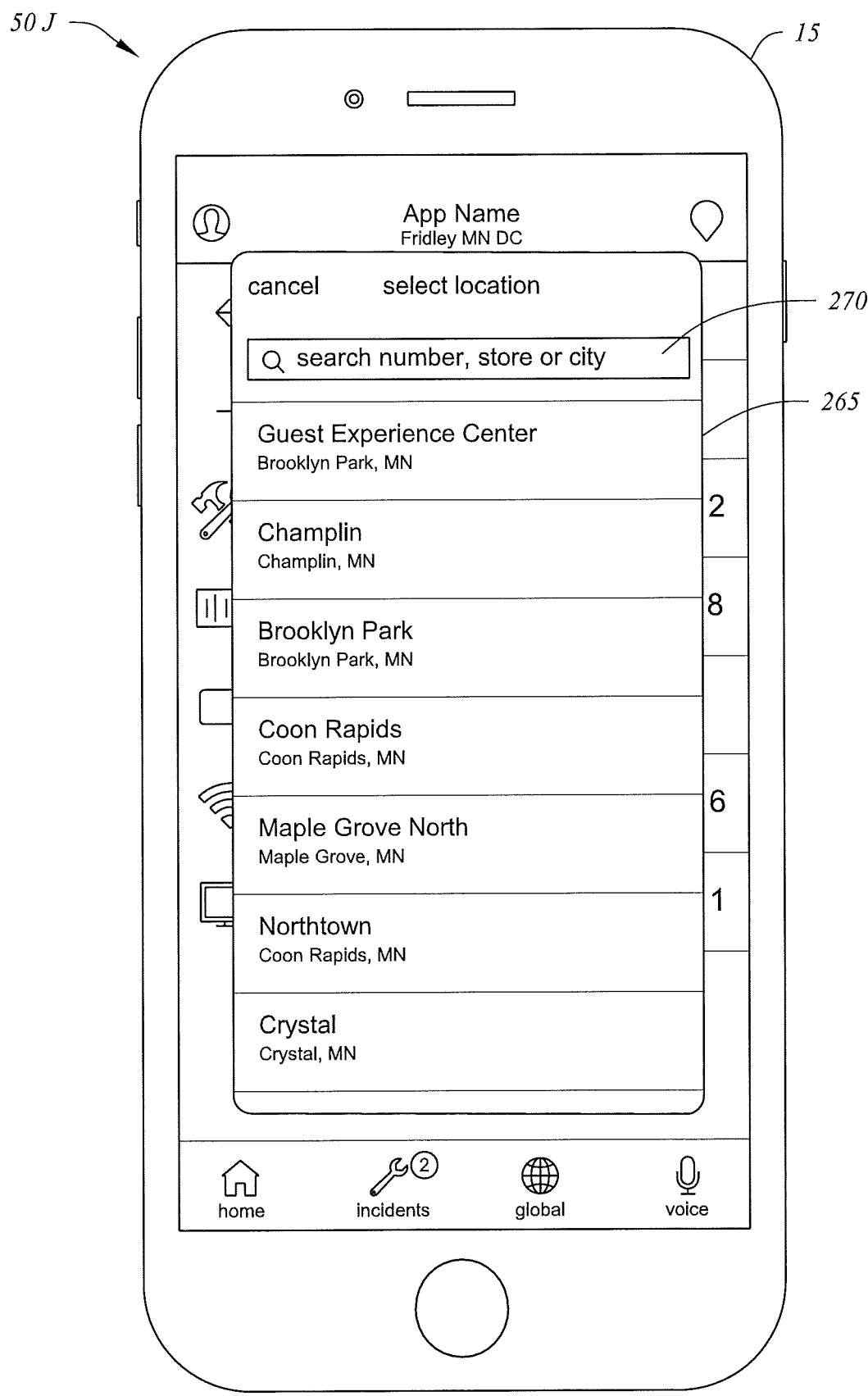

FIG. 2J is a schematic diagram of a user interface 50J, according to an embodiment.

The user interface 50J can, for example, be representative of a location selection page of the IT management system described in this specification.

The user device 15 in the illustrated embodiment is a smartphone. It will be appreciated that the user device 15 is intended as an example and that other types of user devices 15 as described in this specification may be utilized to display the user interface 50A.

The user interface 50J includes a window 265 overlaid on the user interface 50I (FIG. 2I). It will be appreciated that the window 265 can be overlaid on any of the user interfaces 50A-50M. It will be appreciated that the text and images shown in the illustrated embodiment are intended as examples and that the text and images can vary according to the principles described in this specification.

The window 265 can be displayed in response to the user selecting the location selector 250 (FIG. 2I). The window 265 can automatically be populated to show the user a number of stores located within a particular geographical radius of the user, as determined by, for example, the GPS of the user device 15. In an embodiment, the locations may be sorted based on relative distance. Each store location may be selectable so that, for example, the user's store is automatically changed upon the user's selection.

The window 265 can include a search input 270 via which the user can input filtering criteria such as, but not limited to, a store number, a store name, a city, a state, or the like. In an embodiment, the listing of stores may also be filtered based upon a user's access. For example, if a user is only able to access some of the stores, then only those accessible to the user may be displayed in the window 265.

Figure 2K:
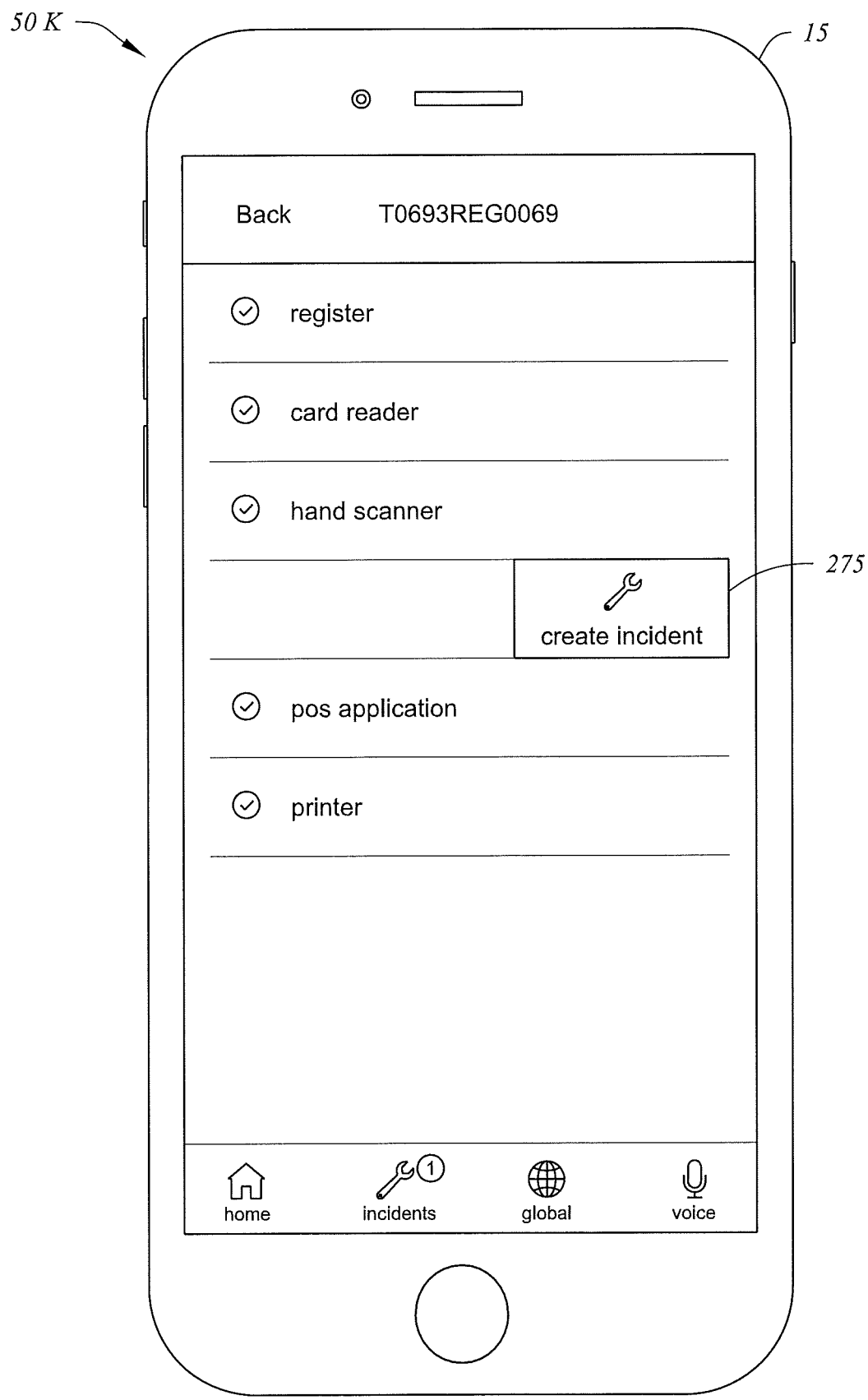

FIG. 2K is a schematic diagram of a user interface 50K, according to an embodiment. The user interface 50K can be, for example, representative of an interface in which a user can see additional information about a particular asset (e.g., register T0693REG0069).

The user device 15 in the illustrated embodiment is a smartphone. It will be appreciated that the user device 15 is intended as an example and that other types of user devices 15 as described in this specification may be utilized to display the user interface 50K. It will be appreciated that the text and images shown in the illustrated embodiment are intended as examples and that the text and images can vary according to the principles described in this specification.

The user interface 50K includes an incident creation button 275. The incident creation button 275 is selectable, for example, to enable the user to create a new incident. For example, the incident creation button 275 may be visible in response to a user performing an action on the user device 15. The action can include, for example, pressing on a combined display and input of the user device 15 for greater than a threshold amount of time, pressing on a combined display and input of the user device 15 with greater than a threshold pressure, swiping along a combined display and input of the user device 15 (e.g., up, down, left, right, etc.), or the like. In an embodiment, by performing an action on the particular cause for the issue (e.g., the hand scanner is not working, or the like), the incident may be created with details of the particular hardware/software pre-filled in the incident creation form. For example, the incident record can be pre-filled to include user information, location, asset having the incident, and date/time of the incident creation.

Figure 2L:
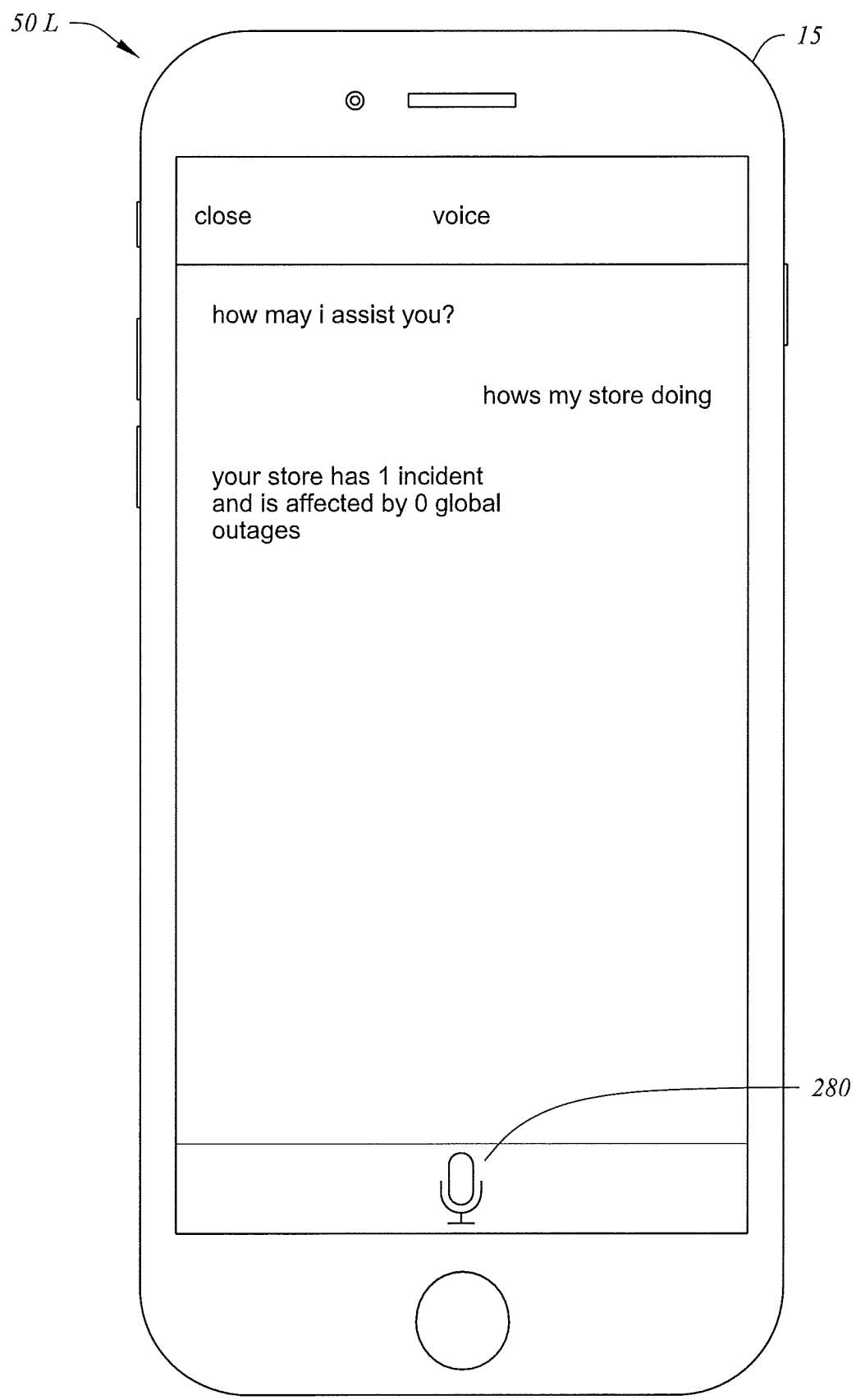

FIG. 2L is a schematic diagram of a user interface 50L, according to an embodiment. The user interface 50L can, for example, be representative of a voice input screen or voice input page of the IT management system described in this specification.

The user device 15 in the illustrated embodiment is a smartphone. It will be appreciated that the user device 15 is intended as an example and that other types of user devices 15 as described in this specification may be utilized to display the user interface 50L.

The user interface 50L may be displayed in response to, for example, the user selecting the voice button 260 (FIG. 2I). To enable the microphone of the user device 15, the user can select the talk button 280. The user interface 50L can include a textual indication of the conversation being input into the system. That is, the user interface 50L can show a textual transcription of the conversation. In an embodiment, the voice response may be limited to questions that are relevant to the system. For example, the voice response may not respond or may indicate that the answer is unknown to a question of "how is the weather?" or the like. The voice response may be trained, for example, to respond to certain questions such as, but not limited to, "how's my store doing?", "are there open incidents?", or the like. Limiting the question pool may, for example, enable an increased efficiency in recognizing the user's question.

In an embodiment, the voice input may be used to, for example, create a new incident in addition to checking status.

Figure 2M:
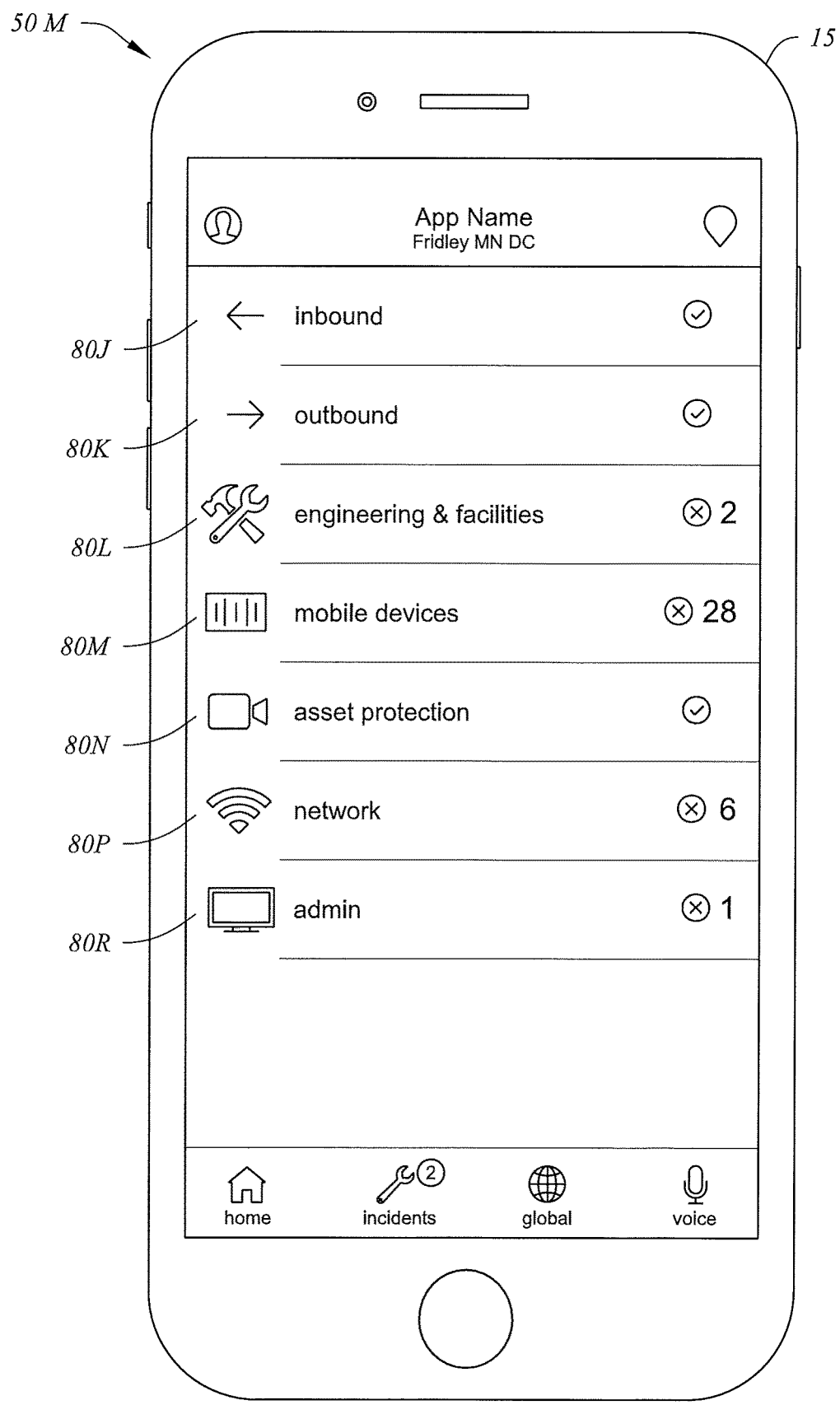

FIG. 2M is a schematic diagram of a user interface 50M, according to an embodiment. The user interface 50M can, for example, be representative of a home screen or initial page of the IT management system for a location other than a store described in this specification. For example, the network of locations can include one or more corporate offices, distribution centers, stores, etc. The types of information relevant to corporate offices and distribution centers can be different from the types of information relevant to the stores. The user interface 50M is representative of a distribution center.

The user device 15 in the illustrated embodiment is a smartphone. It will be appreciated that the user device 15 is intended as an example and that other types of user devices 15 as described in this specification may be utilized to display the user interface 50M.

The body of the user interface 50M includes a plurality of selectable buttons 80J-80R. The buttons 80J-80R are representative of various actions that a user can complete. It will be appreciated that fewer or additional buttons than the buttons 80J-80R can be included in the user interface 50M. The buttons 80J-80R are selectable such that the user can, for example, view incidents related to particular areas of the location (e.g., engineering and facilities button 80K, mobile devices button 80M, etc.), or the like.

As described above, different users may have different privileges, and accordingly, may see different buttons 80J-80R.

Figure 3:
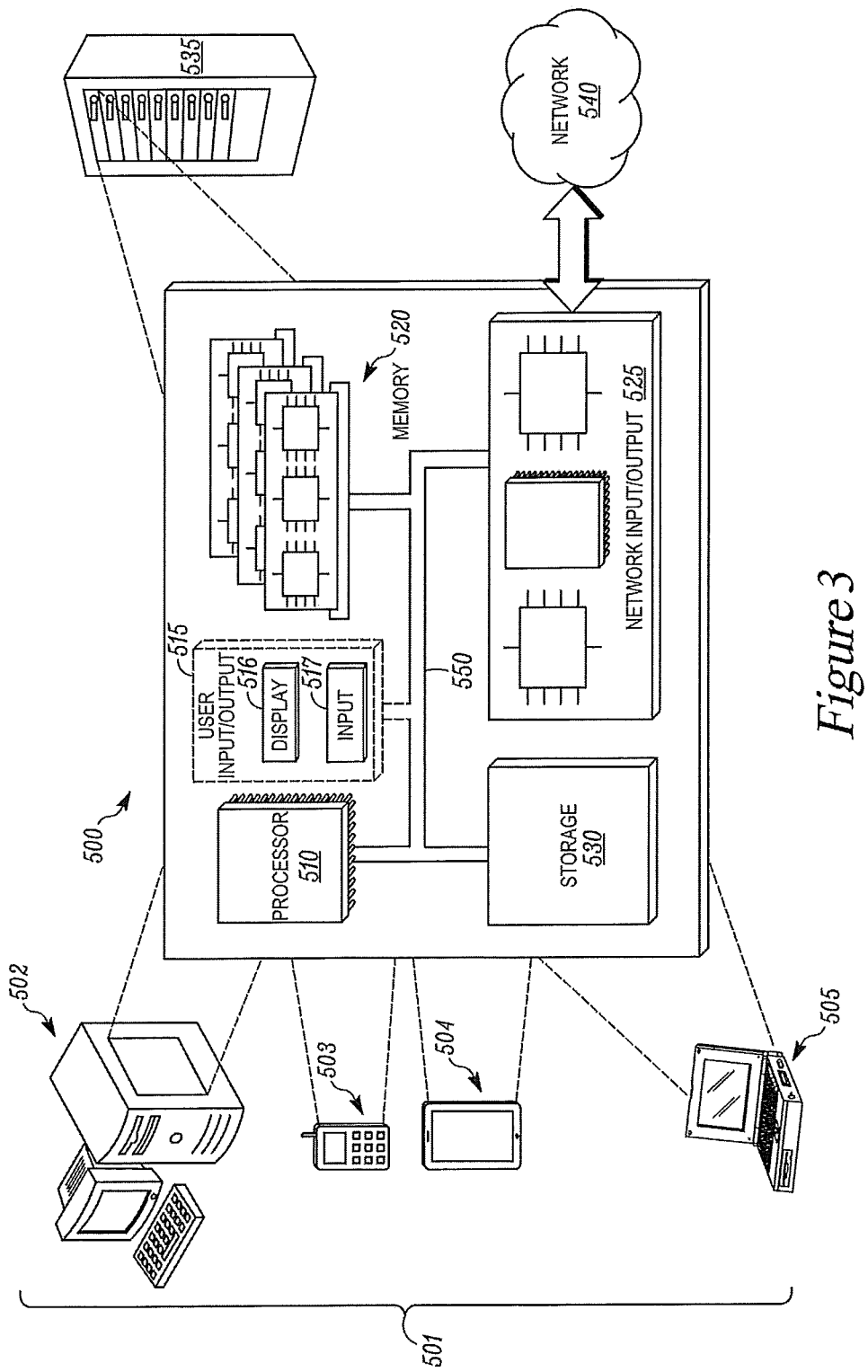
FIG. 3 is a schematic diagram of an architecture for a computer device, according to an embodiment.

FIG. 3 is a schematic diagram of architecture for a computer device 500, according to an embodiment. The computer device 500 and any of the individual components thereof can be used for any of the operations described in accordance with any of the computer-implemented methods described herein.

The computer device 500 generally includes a processor 510, memory 520, a network input/output (I/O) 525, storage 530, and an interconnect 550. The computer device 500 can optionally include a user I/O 515, according to some embodiments. The computer device 500 can be in communication with one or more additional computer devices 500 through a network 540.

The computer device 500 is generally representative of hardware aspects of a variety of user devices 501 and a server device 535. The illustrated user devices 501 are examples and are not intended to be limiting. Examples of the user devices 501 include, but are not limited to, a desktop computer 502, a cellular/mobile phone 503, a tablet device 504, and a laptop computer 505. It is to be appreciated that the user devices 501 can include other devices such as, but not limited to, a personal digital assistant (PDA), a video game console, a television, or the like. In some embodiments, the user devices 501 can alternatively be referred to as client devices 501. In such embodiments, the client devices 501 can be in communication with the server device 535 through the network 540. One or more of the client devices 501 can be in communication with another of the client devices 501 through the network 540 in some embodiments.

The processor 510 can retrieve and execute programming instructions stored in the memory 520 and/or the storage 530. The processor 510 can also store and retrieve application data residing in the memory 520. The interconnect 550 is used to transmit programming instructions and/or application data between the processor 510, the user I/O 515, the memory 520, the storage 530, and the network I/O 540. The interconnect 550 can, for example, be one or more busses or the like. The processor 510 can be a single processor, multiple processors, or a single processor having multiple processing cores. In some embodiments, the processor 510 can be a single-threaded processor. In some embodiments, the processor 510 can be a multi-threaded processor.

The user I/O 515 can include a display 516 and/or an input 517, according to some embodiments. It is to be appreciated that the user I/O 515 can be one or more devices connected in communication with the computer device 500 that are physically separate from the computer device 500. For example, the display 516 and input 517 for the desktop computer 502 can be connected in communication but be physically separate from the computer device 500. In some embodiments, the display 516 and input 517 can be physically included with the computer device 500 for the desktop computer 502. In some embodiments, the user I/O 515 can physically be part of the user device 50I. For example, the cellular/mobile phone 503, the tablet device 504, and the laptop 505 include the display 516 and input 517 that are part of the computer device 500. The server device 535 generally may not include the user I/O 515. In some embodiments, the server device 535 can be connected to the display 516 and input 517.

The display 516 can include any of a variety of display devices suitable for displaying information to the user. Examples of devices suitable for the display 516 include, but are not limited to, a cathode ray tube (CRT) monitor, a liquid crystal display (LCD) monitor, a light emitting diode (LED) monitor, or the like.

The input 517 can include any of a variety of input devices or input means suitable for receiving an input from the user. Examples of devices suitable for the input 517 include, but are not limited to, a keyboard, a mouse, a trackball, a button, a voice command, a proximity sensor, an ocular sensing device for determining an input based on eye movements (e.g., scrolling based on an eye movement), or the like. It is to be appreciated that combinations of the foregoing inputs 517 can be included for the user devices 501. In some embodiments the input 517 can be integrated with the display 516 such that both input and output are performed by the display 516.

The memory 520 is generally included to be representative of a random access memory such as, but not limited to, Static Random Access Memory (SRAM), Dynamic Random Access Memory (DRAM), or Flash. In some embodiments, the memory 520 can be a volatile memory. In some embodiments, the memory 520 can be a non-volatile memory. In some embodiments, at least a portion of the memory can be virtual memory.

The storage 530 is generally included to be representative of a non-volatile memory such as, but not limited to, a hard disk drive, a solid state device, removable memory cards, optical storage, flash memory devices, network attached storage (NAS), or connections to storage area network (SAN) devices, or other similar devices that may store non-volatile data. In some embodiments, the storage 530 is a computer readable medium. In some embodiments, the storage 530 can include storage that is external to the computer device 500, such as in a cloud.

The network I/O 525 is configured to transmit data via a network 540. The network 540 may alternatively be referred to as the communications network 540. Examples of the network 540 include, but are not limited to, a local area network (LAN), a wide area network (WAN), the Internet, or the like. In some embodiments, the network I/O 525 can transmit data via the network 540 through a wireless connection using WiFi, Bluetooth, or other similar wireless communication protocols. In some embodiments, the computer device 500 can transmit data via the network 540 through a cellular, 3G, 4G, or other wireless protocol. In some embodiments, the network I/O 525 can transmit data via a wire line, an optical fiber cable, or the like. It is to be appreciated that the network I/O 525 can communicate through the network 540 through suitable combinations of the preceding wired and wireless communication methods.

The server device 535 is generally representative of a computer device 500 that can, for example, respond to requests received via the network 540 to provide, for example, data for rendering a website on the user devices 501. The server 535 can be representative of a data server, an application server, an Internet server, or the like.

Aspects described herein can be embodied as a system, method, or a computer readable medium. In some embodiments, the aspects described can be implemented in hardware, software (including firmware or the like), or combinations thereof. Some aspects can be implemented in a non-transitory, tangible computer readable medium, including computer readable instructions for execution by a processor. Any combination of one or more computer readable medium(s) can be used.

The computer readable medium can include a computer readable signal medium and/or a computer readable storage medium. A computer readable storage medium can include any tangible medium capable of storing a computer program for use by a programmable processor to perform functions described herein by operating on input data and generating an output. A computer program is a set of instructions that can be used, directly or indirectly, in a computer system to perform a certain function or determine a certain result. Examples of computer readable storage media include, but are not limited to, a floppy disk; a hard disk; a random access memory (RAM); a read-only memory (ROM); a semiconductor memory device such as, but not limited to, an erasable programmable read-only memory (EPROM), an electrically erasable programmable read-only memory (EEPROM), Flash memory, or the like; a portable compact disk read-only memory (CD-ROM); an optical storage device; a magnetic storage device; other similar device; or suitable combinations of the foregoing. A computer readable signal medium can include a propagated data signal having computer readable instructions. Examples of propagated signals include, but are not limited to, an optical propagated signal, an electro-magnetic propagated signal, or the like. A computer readable signal medium can include any computer readable medium that is not a computer readable storage medium that can propagate a computer program for use by a programmable processor to perform functions described herein by operating on input data and generating an output.

Some embodiments can be provided to an end-user through a cloud-computing infrastructure. Cloud computing generally includes the provision of scalable computing resources as a service over a network (e.g., the Internet or the like).

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are exemplary.

What is claimed is:

1. A computer-implemented method for tracking information technology (IT) incidents across a plurality of retail stores via a graphical user interface (GUI) on a display of a user device, wherein the GUI is part of a user device application running on the user device, the method comprising:

a server, remote from the user device, communicating with the user device via a network and the server providing access to an IT management system to the user device via the GUI;

the server receiving, from the user device, a store identifier;

the server determining one or more IT incidents based on the store identifier, wherein the one or more IT incidents includes one or more local incidents impacting a first retail store of the plurality of retail stores associated with the store identifier and includes one or more global incidents impacting two or more of the plurality of retail stores;

the user device application accessing the one or more IT incidents;

the GUI displaying on the display of the user device a status of the one or more IT incidents based on the store identifier, wherein the displaying includes displaying the one or more local incidents and separately displaying the one or more global incidents independently of the one or more local incidents, and wherein the displaying further includes displaying an estimated resolution time for each of the one or more IT incidents;

the GUI displaying two or more categories of retail store assets at the first retail store associated with the store identifier, wherein each of the two or more categories of retail store assets is selectable by a user operating the user device;

the server receiving, from the user device, a first selection of a category of retail store assets from the two or more categories of retail store assets;

upon receipt of the first selection, the user device application accessing and the GUI displaying each of one or more retail store assets within the category of retail store assets, wherein each of the one or more retail store assets is selectable, via the GUI, by the user operating the user device;

the server receiving, from the user device, a second selection of a first retail store asset of the one or more retail store assets;

upon receipt of the second selection, the user device application accessing and the GUI displaying information regarding a status of the first retail store asset;

displaying on the GUI an incident creation button to enable the user to create a new IT incident report;

the server receiving, from the user device, a third selection of the incident creation button to allow the user to create the new IT incident report;

upon receipt of the third selection, the user device application automatically generating an incident creation form pre-filled with user information regarding the user of the user device, a location where a new IT incident occurred, an asset having the new IT incident, and a date/time of the new IT incident report;

upon completion of the incident creation form, the user device application sending the new incident to the server;

the user device application automatically removing from the GUI any of the one or more IT incidents which are no longer active.

2. The computer-implemented method according to claim 1, further comprising the server receiving, from the user device, a request to change to a different location including a second store identifier;

the server determining one or more second IT incidents based on the second store identifier, wherein the one or more second IT incidents includes one or more second local incidents impacting a second retail store of the plurality of retail stores associated with the second store identifier and includes one or more second global incidents impacting a second plurality of the plurality of retail stores; and the GUI displaying on the display of the user device a second status of the one or more second IT incidents based on the second store identifier.

3. The computer-implemented method according to claim 1, further comprising receiving from the user device feedback about the IT management system.

4. The computer-implemented method according to claim 1, wherein the GUI displaying on the display of the user device the status of the one or more IT incidents based on the store identifier further includes the GUI displaying an estimated resolution time of the one or more IT incidents.

5. The computer-implemented method according to claim 1, further comprising receiving from the user device, an inquiry via a voice input received by the user device.

6. The computer-implemented method according to claim 1, further comprising:
a second user device identifying a second new IT incident impacting the first retail store associated with the store identifier and sending the second new IT incident to the server; and
the server sending the second new IT incident to the user device.

7. The computer-implemented method according to claim 1, further comprising:
the user device application allowing the user device to communicate with the server when on premises at the location, and preventing the user device from communicating with the server when off premises.

8. The computer-implemented method according to claim 7, wherein the user device application is on premises when the user device is connected to the network of the location and off premises when the user device is disconnected from the network of the location.

9. The computer-implemented method according to claim 1, further comprising the server sending an alert to the user device when a second new IT incident impacting the first retail store associated with the store identifier is identified.

10. The computer-implemented method according to claim 9, wherein the alert causes one or more of a sound, a vibration, a popup message, or the like on the user device.

11. The computer-implemented method according to claim 1, further comprising:
a global positioning system (GPS) of the user device determining the location of the user device;
the user device application determining the store identifier based on the location of the user device as determined by a global positioning system (GPS) of the user device.

12. The computer-implemented method according to claim 1, wherein the category of retail store assets is a grouping of front end assets including a cash register, a gift registry, and a cash office.

13. A system for tracking information technology (IT) incidents across a plurality of retail stores, the system comprising:
a user device including a display, wherein a user device application is loaded onto the user device, the user device application including a graphical user interface (GUI) configured to permit the user device to communicate with a server via a network;
a server, remote from the user device, configured to communicate with the user device via the network, and the server providing the user device access to an IT management system via the GUI,
wherein the server is configured to: receive, from the user device, a store identifier; and determine one or more IT incidents based on the store identifier, wherein the one or more IT incidents includes one or more local incidents impacting a first retail store of the plurality of retail stores associated with the store identifier and includes one or more global incidents impacting two or more of the plurality of retail stores, wherein the user device application is configured to access the one or more IT incidents, and wherein the GUI is configured to display on the display of the user device a status of the one or more IT incidents based on the store identifier including: displaying the one or more local incidents, and separately displaying the one or more global incidents independently of the one or more local incidents; and wherein the GUI is further configured to display an estimated resolution time for each of the one or more IT incidents;
wherein the GUI is configured to display two or more categories of retail store assets at the first retail store associated with the store identifier, wherein each of the two or more categories of retail store assets is selectable by a user operating the user device, wherein the server is configured to receive, from the user device, a first selection of a category of retail store assets from the two or more categories of retail store assets, and wherein, upon receipt of the first selection, the user device application is configured to access and the GUI is configured to display each of one or more retail store assets within the category of retail store assets, wherein each of the one or more retail store assets is selectable, via the GUI, by the user operating the user device;

wherein the server is configured to receive, from the user device, a second selection of a first retail store asset of the one or more retail store assets, and wherein, upon receipt of the second selection, the user device application is configured to access and the GUI is configured to display information regarding a status of the first retail store asset;

wherein the GUI is configured to display an incident creation button to enable the user to create a new IT incident report, wherein the server is configured to receive, from the user device, a third selection of the incident creation button to allow the user to create the new IT incident report, wherein, upon receipt of the third selection, the user device application is configured to automatically generate an incident creation form pre-filled with user information regarding the user of the user device, a location where a new IT incident occurred, an asset having the new IT incident, and a date/time of the new incident report, and wherein upon completion of the incident creation form, the user device application is configured to send the new incident to the server;

wherein the user device application is configured to automatically remove from the GUI any of the one or more IT incidents which are no longer active.

14. The system according to claim 13, wherein the system includes a second user device, when the second user device identifies a second new IT incident impacting the first retail store associated with the store identifier and sends the second new IT incident to the server, the server is configured to send the second new IT incident to the user device.

15. The system according to claim 13, wherein the user device application is configured to allow the user device to communicate with the server when on premises at the location, and is configured to prevent the user device from communicating with the server when off premises.

16. The system according to claim 15, wherein the user device application is on premises when the user device is connected to the network of the location and off premises when the user device is disconnected from the network of the location.

17. The system according to claim 13, wherein the server is configured to send an alert to the user device when a second new IT incident impacting the first retail store associated with the store identifier is identified.

18. The system according to claim 17, wherein the alert causes one or more of a sound, a vibration, a popup message, or the like on the user device.

19. The system according to claim 13, wherein the store identifier is determined from a location of the user device as determined by a global positioning system (GPS) of the user device.

20. The system according to claim 13, wherein the category of retail store assets is a grouping of front end assets including a cash register, a gift registry, and a cash office.

* * * * *